(12) United States Patent
Verstraete et al.

(10) Patent No.: US 12,337,270 B2
(45) Date of Patent: Jun. 24, 2025

(54) FILTER ELEMENTS AND METHODS OF MANUFACTURING FILTER ELEMENTS

(71) Applicant: Donaldson Company, Inc., Bloomington, MN (US)

(72) Inventors: Mathijs Verstraete, Tienen (BE); Gert Proost, Kessel-lo (BE)

(73) Assignee: Donaldson Company, Inc., Bloomington, MN (US)

( * ) Notice: Subject to any disclaimer, the term of this patent is extended or adjusted under 35 U.S.C. 154(b) by 599 days.

(21) Appl. No.: 17/629,933

(22) PCT Filed: Jul. 24, 2020

(86) PCT No.: PCT/US2020/043559
§ 371 (c)(1),
(2) Date: Jan. 25, 2022

(87) PCT Pub. No.: WO2021/021655
PCT Pub. Date: Feb. 4, 2021

(65) Prior Publication Data
US 2022/0288522 A1 Sep. 15, 2022

Related U.S. Application Data

(60) Provisional application No. 62/878,941, filed on Jul. 26, 2019.

(51) Int. Cl.
*B01D 46/24* (2006.01)
*B01D 29/11* (2006.01)
(Continued)

(52) U.S. Cl.
CPC .......... *B01D 46/2414* (2013.01); *B01D 29/11* (2013.01); *B01D 29/111* (2013.01);
(Continued)

(58) Field of Classification Search
CPC ... B01D 46/2414; B01D 29/11; B01D 29/111; B01D 46/0001; B01D 46/2411;
(Continued)

(56) References Cited

U.S. PATENT DOCUMENTS 5,820,646 A 10/1998 Gillingham et al.
6,350,291 B1 2/2002 Gieseke et al.
(Continued)

FOREIGN PATENT DOCUMENTS

CN 1590746 A 3/2005
CN 109414640 A 3/2019
(Continued)

OTHER PUBLICATIONS

Machine-generated English translation of EP 1796814, generated on Jun. 13, 2024.*
(Continued)

*Primary Examiner* — Fred Prince
(74) *Attorney, Agent, or Firm* — Mueting Raasch Group

(57) ABSTRACT

A filter element, for placement in a housing of a filter system, includes a filter medium pack and a seal arrangement having a seal and a seal carrier. The filter medium pack includes, for example, a pleated filter medium or a fluted filter medium. The seal carrier includes an axial side coupled to at least a portion of an axial face of the filter medium pack by a thermal welding manufacturing process. The coupling of the seal to the seal carrier is obtainable by manufacturing the seal arrangement with a multi-material injection molding manufacturing process. The present disclosure further relates to a method for manufacturing a filter element, the method including steps of thermal welding and multi-material injection molding.

19 Claims, 15 Drawing Sheets

Figure 1:
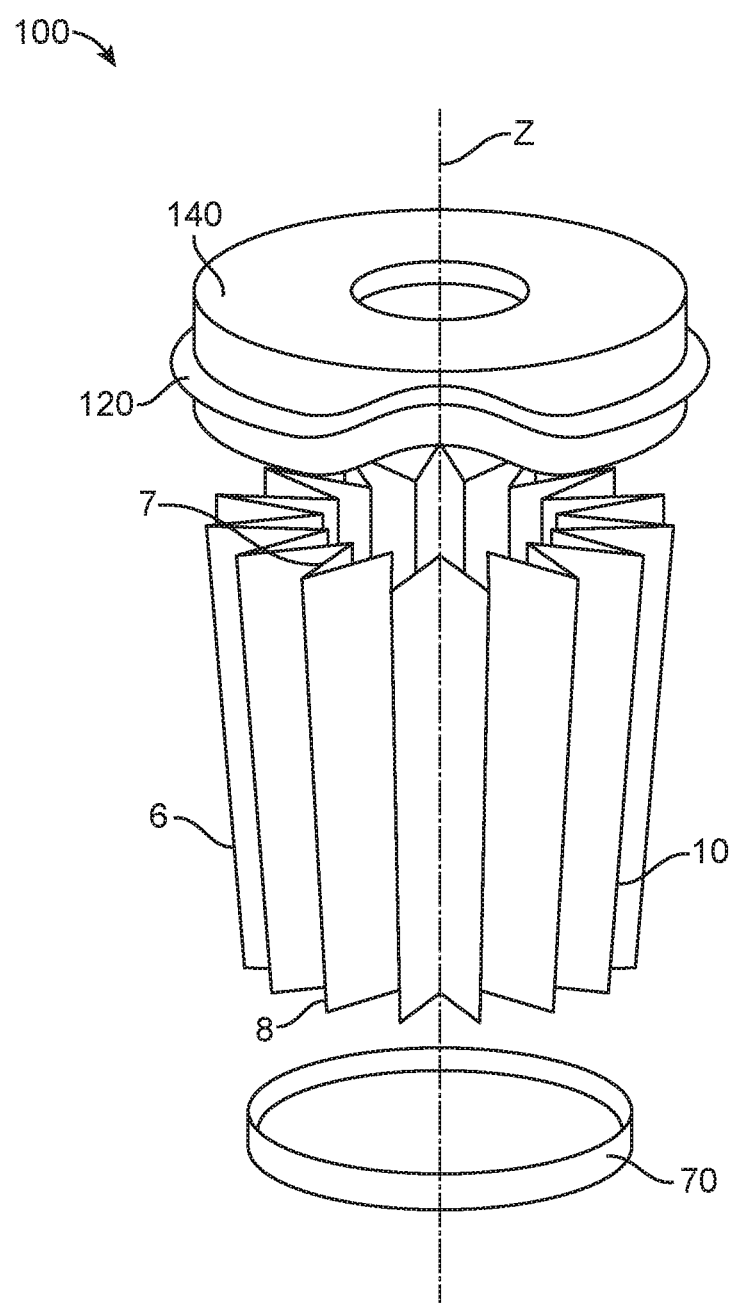

(51) Int. Cl.
    *B01D 46/00*     (2022.01)
    *B01D 46/52*     (2006.01)
(52) U.S. Cl.
    CPC ...... *B01D 46/0001* (2013.01); *B01D 46/2411* (2013.01); *B01D 46/525* (2013.01); *B01D 46/526* (2013.01); *B01D 46/527* (2013.01); *B01D 2201/291* (2013.01); *B01D 2201/342* (2013.01); *B01D 2201/347* (2013.01); *B01D 2265/04* (2013.01); *B01D 2271/02* (2013.01); *B01D 2271/022* (2013.01); *B01D 2271/025* (2013.01); *B01D 2271/027* (2013.01); *B01D 2275/105* (2013.01); *B01D 2279/60* (2013.01)
(58) Field of Classification Search
    CPC .. B01D 46/525; B01D 46/526; B01D 46/527; B01D 2201/291; B01D 2201/342; B01D 2201/347; B01D 2265/04; B01D 2271/02; B01D 2271/022; B01D 2271/025; B01D 2271/027; B01D 2275/105; B01D 2279/60
    USPC .......................................... 210/493.2, 497.01
    See application file for complete search history.

(56)     References Cited

U.S. PATENT DOCUMENTS

| | | | |
|---|---|---|---|
| 7,396,376 | B2 * | 7/2008 | Schrage ............... B01D 46/527 55/482 |
| 8,292,983 | B2 | 10/2012 | Reichter et al. |
| 8,685,128 | B2 | 4/2014 | Schrage et al. |
| 2002/0100262 | A1 | 8/2002 | Gieseke et al. |
| 2006/0037296 | A1 | 2/2006 | Duffy |
| 2007/0261662 | A1 | 11/2007 | Lampert et al. |
| 2009/0320424 | A1 | 12/2009 | Merritt et al. |
| 2010/0044297 | A1 * | 2/2010 | Krogue .............. B01D 53/0431 210/493.4 |
| 2012/0311983 | A1 | 12/2012 | Swanson et al. |
| 2013/0152524 | A1 | 6/2013 | Gensler et al. |
| 2014/0260139 | A1 * | 9/2014 | Merritt .............. B01D 46/0005 55/497 |
| 2017/0333818 | A1 * | 11/2017 | Way .................. B01D 46/0001 |
| 2018/0318745 | A1 | 11/2018 | Nichols et al. |
| 2018/0369735 | A1 | 12/2018 | Decoster et al. |
| 2019/0209960 | A1 | 7/2019 | Luchesi De Almeida et al. |
| 2020/0108342 | A1 | 4/2020 | Holm et al. |

FOREIGN PATENT DOCUMENTS

| | | | | |
|---|---|---|---|---|
| EP | 0685251 | A1 | 12/1995 | |
| EP | 1021232 | A1 | 7/2000 | |
| EP | 1796814 | A1 | 6/2007 | |
| EP | 2582442 | B1 | 9/2016 | |
| EP | 2140922 | B1 | 10/2019 | |
| EP | 3680002 | A1 | 7/2020 | |
| EP | 4035757 | A1 * | 8/2022 | ......... B01D 46/0001 |
| JP | H09141010 | A | 6/1997 | |
| JP | H11508180 | A | 7/1999 | |
| JP | 2010012460 | A | 1/2010 | |
| JP | 2010540234 | A | 12/2010 | |
| WO | 2011115973 | A2 | 9/2011 | |
| WO | 2021006927 | A1 | 1/2021 | |
| WO | 2021021655 | A1 | 2/2021 | |

OTHER PUBLICATIONS

International Preliminary Report on Patentability in PCT/US2020/043559, mailed Feb. 1, 2022, 9 pages.
International Search Report and Written Opinion in PCT/US2020/043559, mailed Oct. 8, 2020, 12 pages.

* cited by examiner

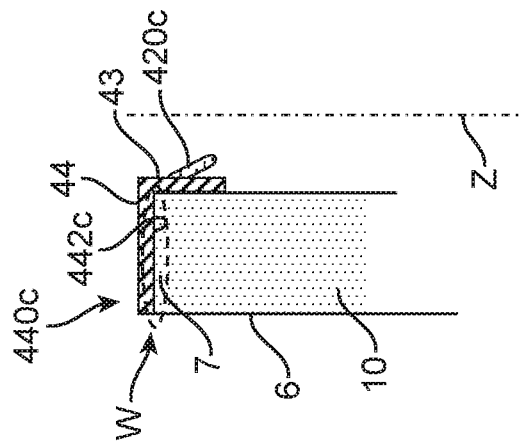
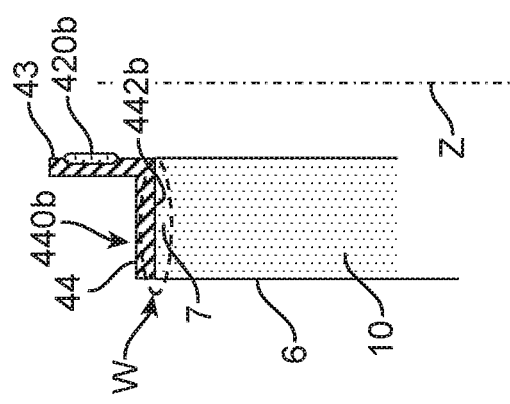
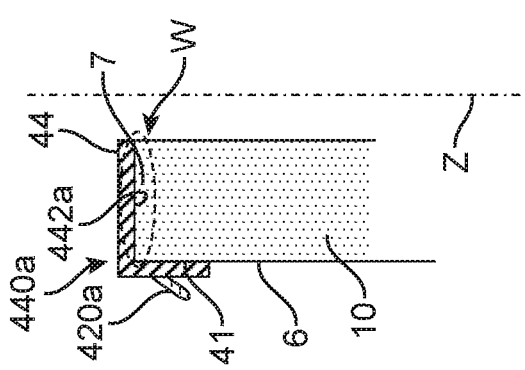

FILTER ELEMENTS AND METHODS OF MANUFACTURING FILTER ELEMENTS

CROSS-REFERENCE TO RELATED APPLICATIONS

This application is the § 371 U.S. National Stage of International Application No. PCT/US2020/043559, filed 24 Jul. 2020, which claims the benefit of U.S. Provisional Application Ser. No. 62/878,941, filed Jul. 26, 2019, the disclosures of which are incorporated by reference herein in their entireties.

FIELD OF THE DISCLOSURE

The present disclosure relates to a filter element for filtering a fluid, more specifically a filter element that may be inserted into a housing of a filter system and may be removed for servicing. The disclosure is also related to a method of manufacturing a filter element.

BACKGROUND

Filter elements for filtering a fluid, also referred to as filter cartridges, are used for a wide variety of filtering applications. The fluid can be a liquid or a gas including, for example, air.

Indeed, in many instances, it is desired to filter contaminant material from a fluid stream using a filter element. For example, airflow streams to engines for motorized vehicles or for power generation equipment, construction equipment or other equipment, gas streams to gas turbine systems and air streams to various combustion furnaces, carry particulate contaminant therein. It is preferred for such systems that contaminant materials be removed from the fluid or at least be reduced.

The filter element can be constructed as an element that is to be removed and replaced from a housing of the filter system at regular time intervals or when the filtering performance has dropped below a critical threshold level.

The filter element includes a filter medium pack including filter media. The filter media remove contaminant materials when the fluid flows through the filter media. Commonly used and commercially available filter media are for example pleated media or fluted media. The fluted media are also referred to as Z-filter media.

An example of a filter medium pack including fluted media is described in U.S. Pat. No. 7,396,376. The filter medium pack includes an outer circumferential face forming a radial boundary of the filter medium pack. The outer circumferential face is generally extending in a longitudinal direction from a first axial face to a second opposing face.

The filter element includes besides the filter medium pack also a seal arrangement for separating filtered from unfiltered fluid. Indeed, for proper operation of a filter element, it is essential that the filter medium pack is properly sealed to the housing wherein the filter medium pack is inserted.

Various types of seal arrangements for a filter element have been proposed. Typically, when for example pleated media are used, the seal arrangement is formed by foamed polyurethane (PU) obtained by a molding technique. Advantageously, the foamed PU seal arrangement is not only closing the pleats at the first axial face of the filter medium pack but a circumferential surface of the PU seal arrangement can also be used as a radial or axial seal for properly sealing to the housing. An end cap, generally also made of foamed PU is used to close the pleats at the second axial face of the filter medium pack.

In U.S. Pat. No. 7,396,376, a foamed polyurethane (PU) seal arrangement is disclosed that is used in combination with a fluted filter medium pack. During the manufacturing process, the filter medium pack is placed in a mold together with a reinforcing frame element. Thereafter the mold is filled with PU and, following a rising process, a so-called overmold of foamed PU is formed. The reinforcing frame element provides strength to the seal and also compensates for the irregular shape of the filter medium pack.

However, a disadvantage of PU seal arrangements is that they are less suited for environments where the temperature can become high, for example, temperatures above about 80° C. Further, due to the foamed PU manufacturing process, the filter elements do not always have an aesthetic appearance.

Alternatives for foamed seal arrangements include seal arrangements that include mechanical gaskets such as O-rings that are resistive to higher temperatures and can be coupled to the filter medium pack, for instance through a gasket carrier. These type of alternative seal arrangements can also make use of adhesives, for example a glue for joining a gasket carrier to a filter medium pack.

A disadvantage of using seal arrangements including mechanical gaskets or arrangements involving the use of adhesives is that the manufacturing process can be more time consuming and the seal arrangements involving multiple components can be less robust.

The specific configuration of the seal arrangement to be applied is generally also dependent on the type of filter medium pack being used and hence there is not always a uniform manufacturing process available for manufacturing a filter element.

Hence, it is desirable to provide both more robust and cost-effective filter elements and to provide an improved a process for manufacturing filter elements.

SUMMARY

It is an object of the present disclosure to provide a filter element for filtering fluids that is robust and cost-effective. It is a further object of the disclosure to provide a method for manufacturing filter elements that is cost-effective and that may be applied for a variety of types of filter medium packs.

In one aspect, this disclosure describes a filter element that includes a filter medium pack and a molded single-structure seal arrangement. The filter medium pack includes an outer circumferential face extending in a longitudinal direction and a first axial face transverse to said longitudinal direction. The molded single-structure seal arrangement includes a seal and a seal carrier, wherein the seal comprises a first material and the seal carrier comprises a second material, and wherein the second material is different from the first material. The seal carrier includes a first axial side, and the first axial side of the seal carrier is thermally welded to at least a circumferential portion of the first axial face of the filter medium pack.

In another aspect, this disclosure describes a filter element for placing in a housing of a filter system. The filter element includes a filter medium pack for filtering a fluid and a seal arrangement for separating filtered from unfiltered fluid when the filter element is operationally placed in the housing. The filter medium pack include an outer circumferential face extending in a longitudinal direction and a first axial face transverse to said longitudinal direction. The seal arrangement includes a seal made of at least a first material and a seal carrier made of at least a second material, wherein the second material is different from the first material. The seal is coupled to the seal carrier, and the coupling of the seal to the seal carrier is obtained by manufacturing the seal arrangement from the first material and the second material using a multi-component injection molding manufacturing process. The seal carrier includes a first axial side that is coupled to at least a circumferential portion of the first axial face of the filter medium pack by a thermal welding manufacturing process.

In a further aspect, this disclosure describes a method of manufacturing a filter element. The method includes: providing a filter medium pack having a circumferential face extending in a longitudinal direction, and a first axial face transverse to said longitudinal direction; providing a seal carrier; and applying a thermal welding manufacturing process to couple a first axial side of the seal carrier to at least a circumferential portion of a first axial face of the filter medium pack. In some embodiments, the seal arrangement includes a molded single-structure seal arrangement comprising a seal carrier. In some embodiments, the seal arrangement includes a molded single-structure seal arrangement comprising a seal and a seal carrier. In some embodiments, the method further includes coupling the seal to the seal carrier by a multi-component injection molding manufacturing process. The seal may be coupled to the seal carrier prior to the application of the thermal welding manufacturing process or after the application of the thermal welding manufacturing process.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

Unless otherwise specified, "a," "an," "the," and "at least one" are used interchangeably and do not exclude the presence of more than one.

The term "and/or" means one or all of the listed elements or a combination of any two or more of the listed elements.

Any reference to standard methods (e.g., ASTM, TAPPI, AATCC, etc.) refer to the most recent available version of the method at the time of filing of this disclosure unless otherwise indicated.

The terms inclusion of terms "first," "second," and the like herein, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Also herein, the recitations of numerical ranges by endpoints include all numbers subsumed within that range (e.g., 1 to 5 includes 1, 1.5, 2, 2.75, 3, 3.80, 4, 5, etc.).

Herein, "up to" a number (for example, up to 50) includes the number (for example, 50).

The term "in the range" or "within a range" (and similar statements) includes the endpoints of the stated range.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

For any method disclosed herein that includes discrete steps, the steps may be conducted in any feasible order. And, as appropriate, any combination of two or more steps may be conducted simultaneously.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

SHORT DESCRIPTION OF THE DRAWINGS

Figure 2B:
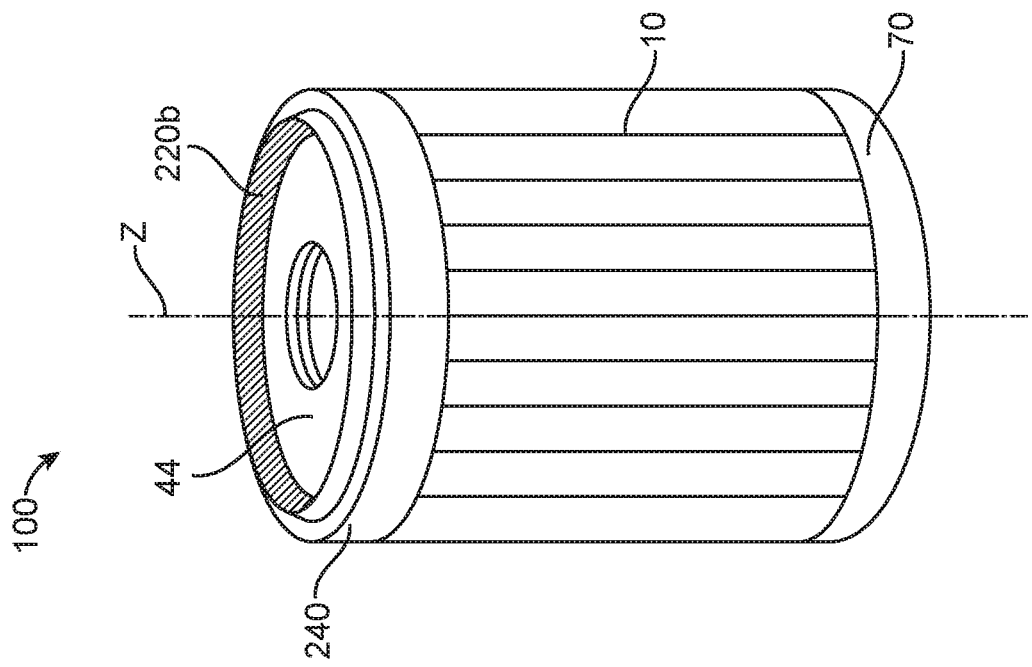
Figure 2A:
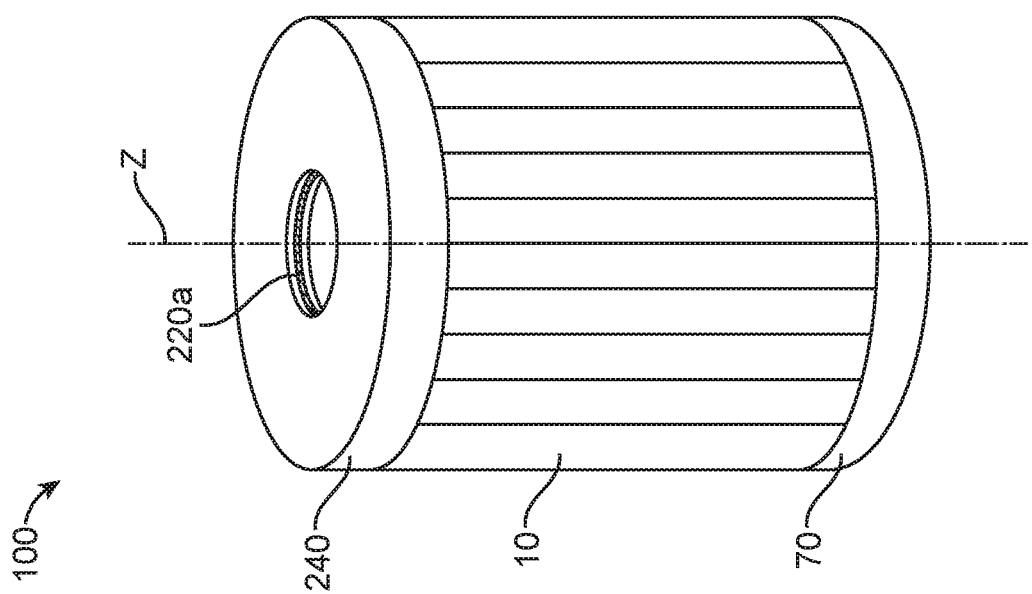
Figure 3:
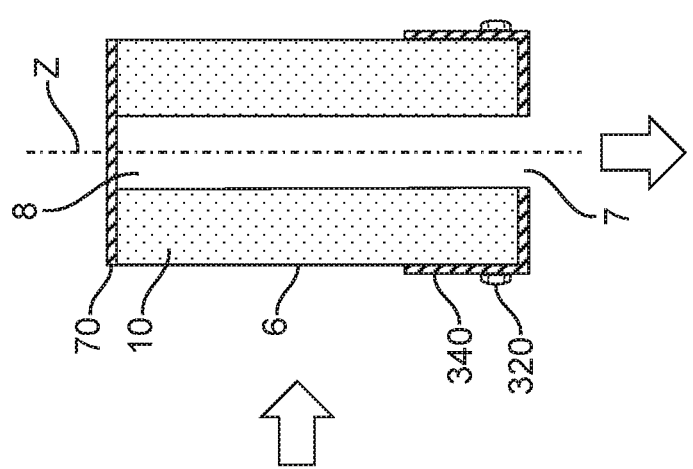
Figure 4F:
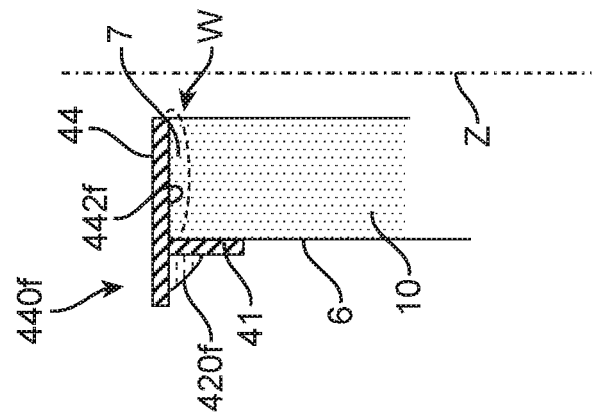
Figure 4E:
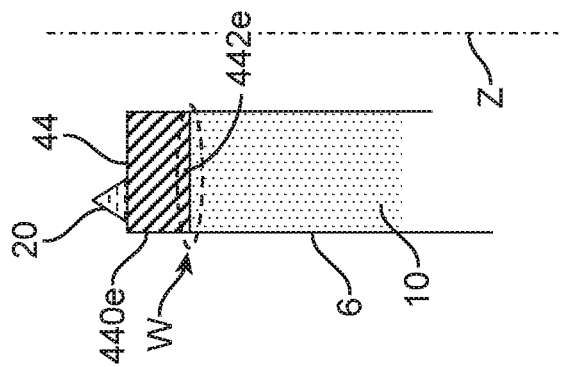
Figure 4D:
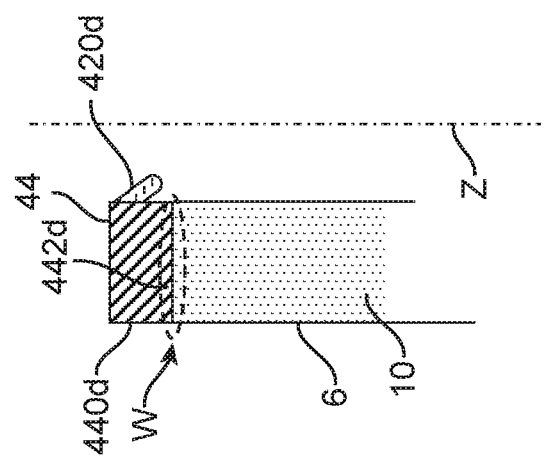
Figure 5:
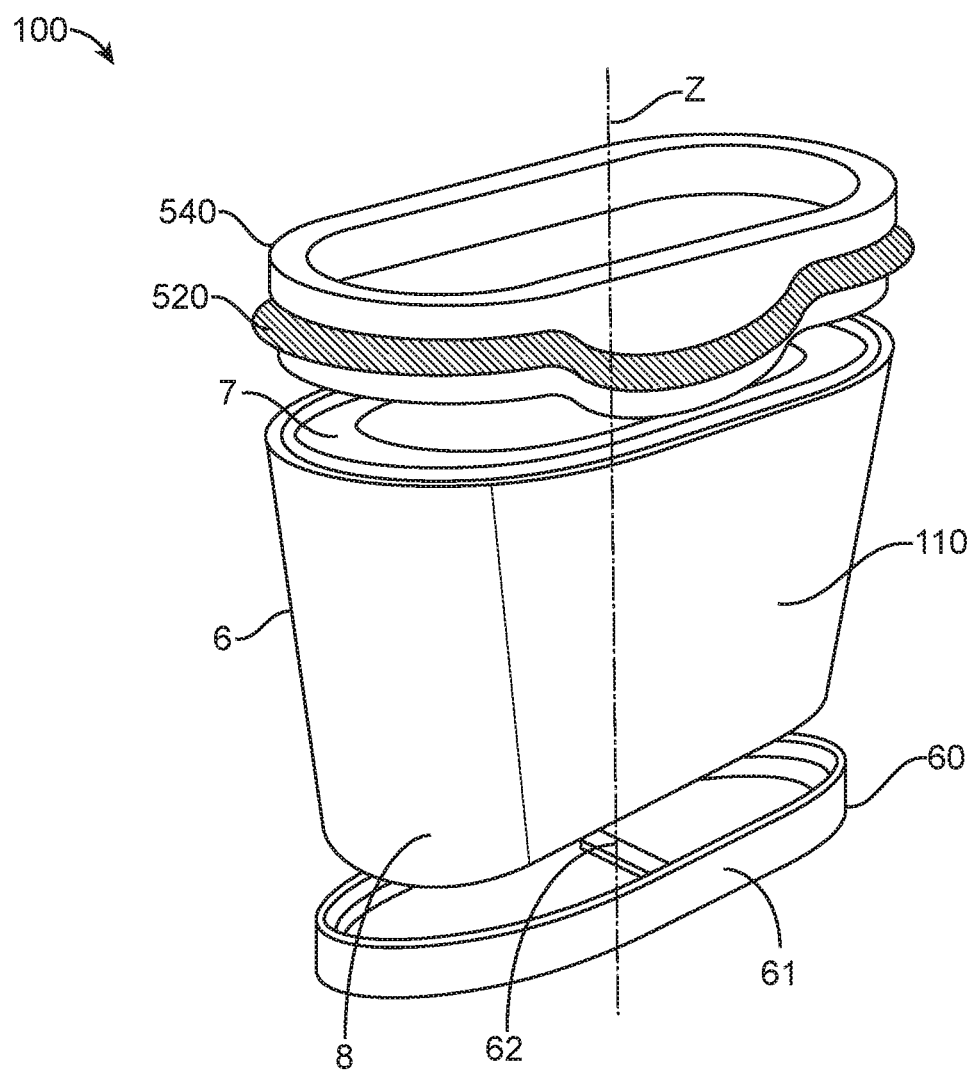
Figure 6:
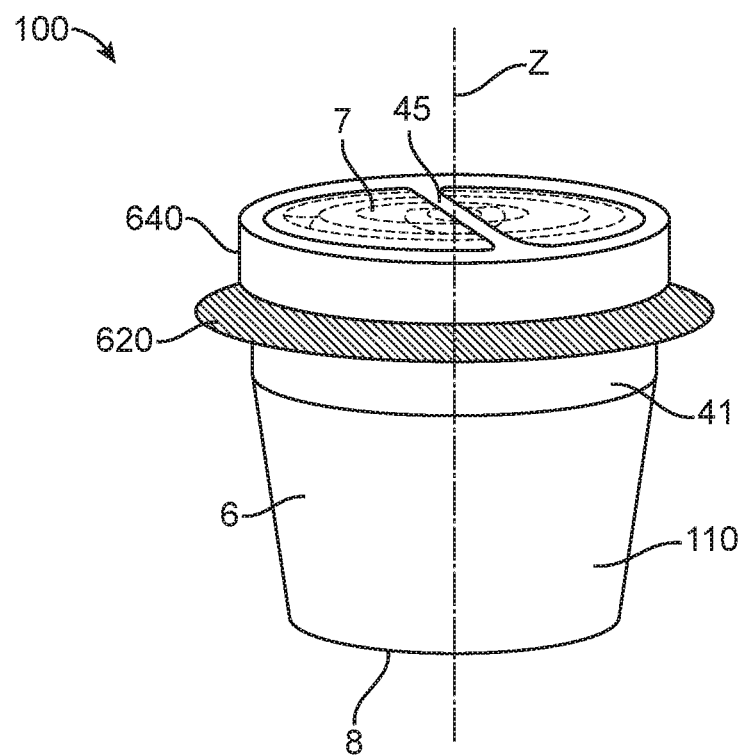
Figure 8:
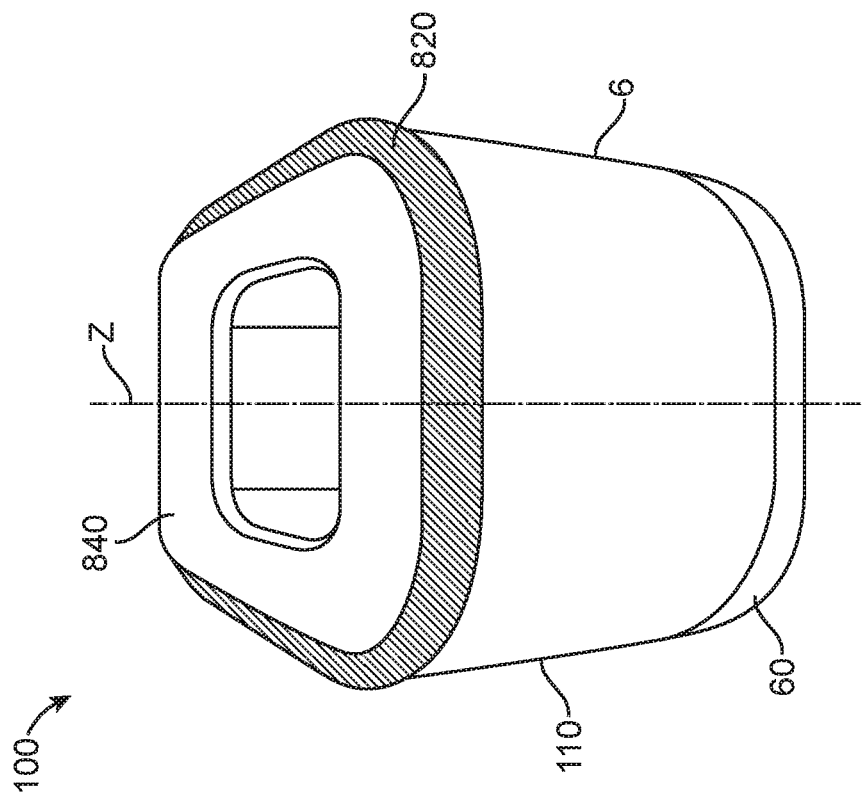
Figure 7:
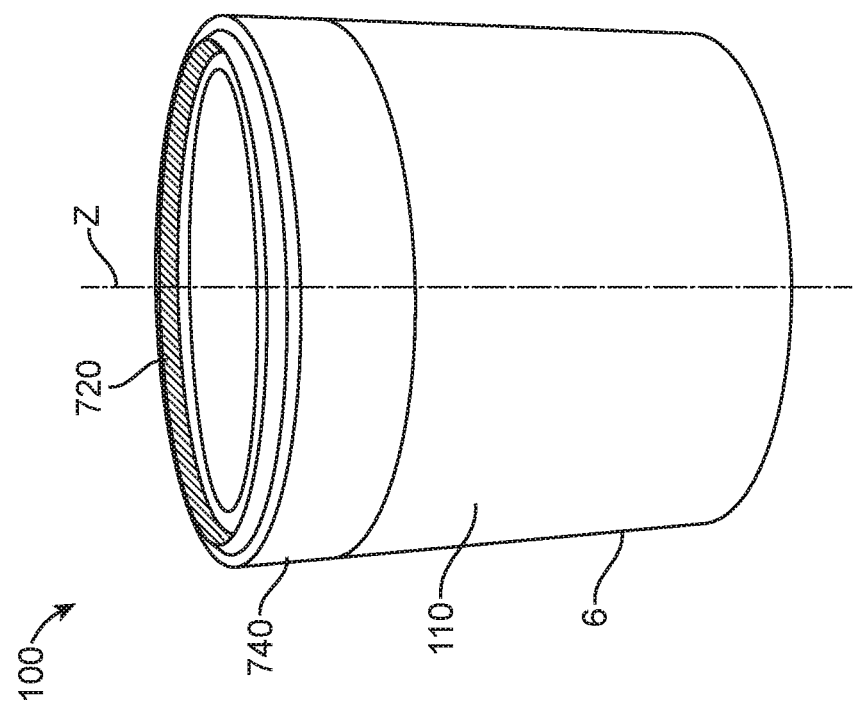
Figure 9C:
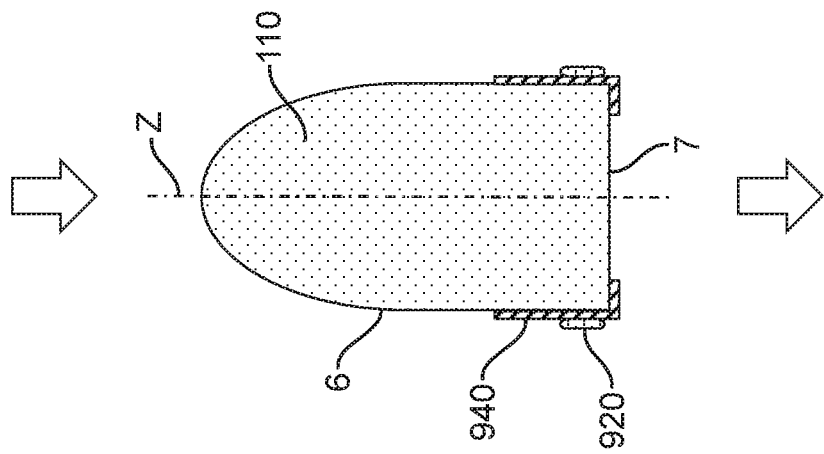
Figure 9B:
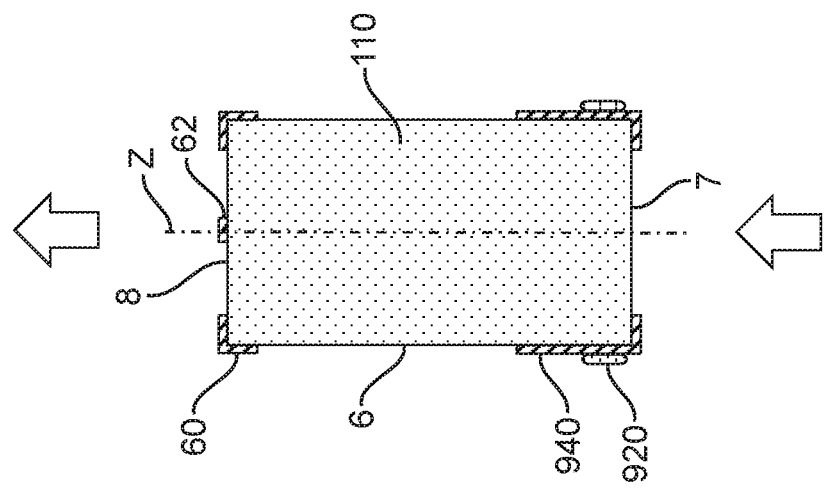
Figure 9A:
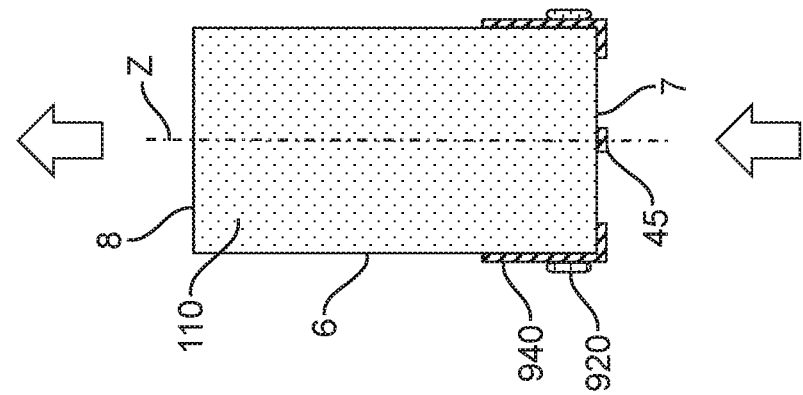
Figure 10C:
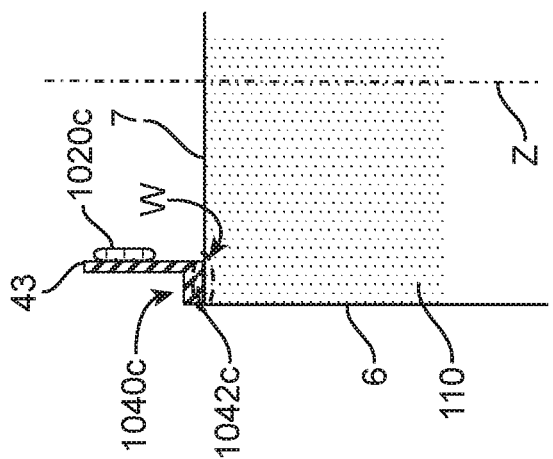
Figure 10B:
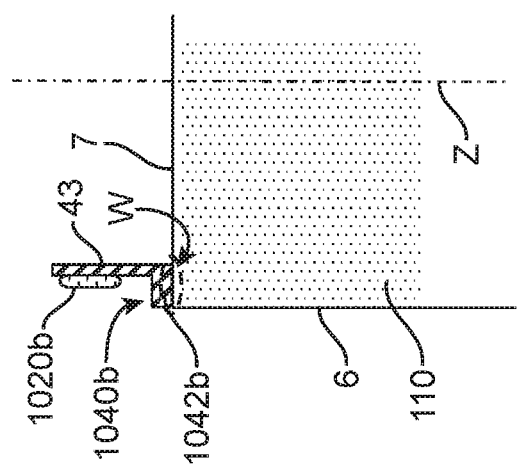
Figure 10A:
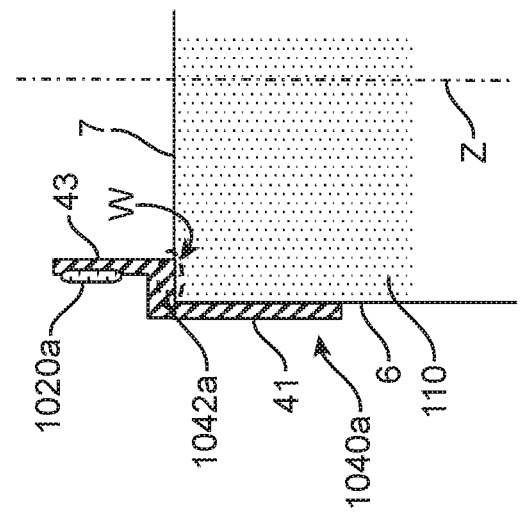
Figure 10E:
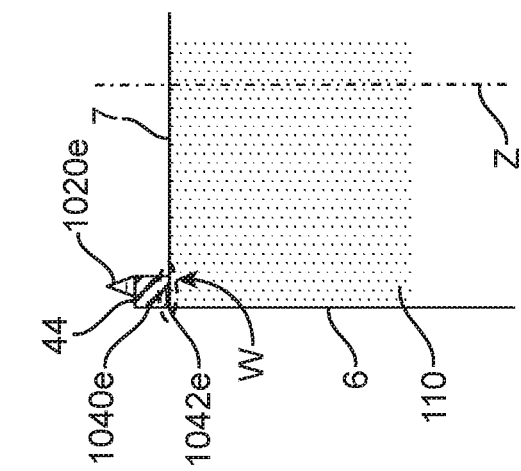
Figure 10D:
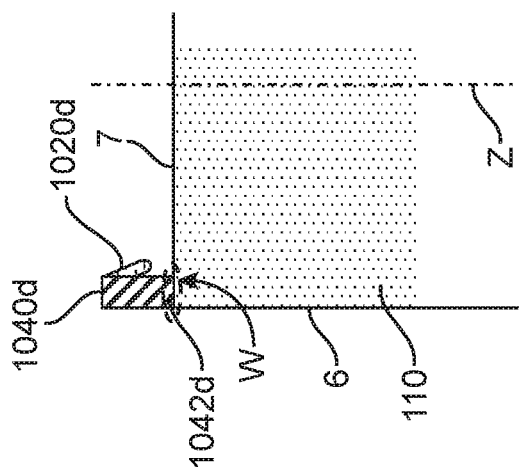
Figure 11B:
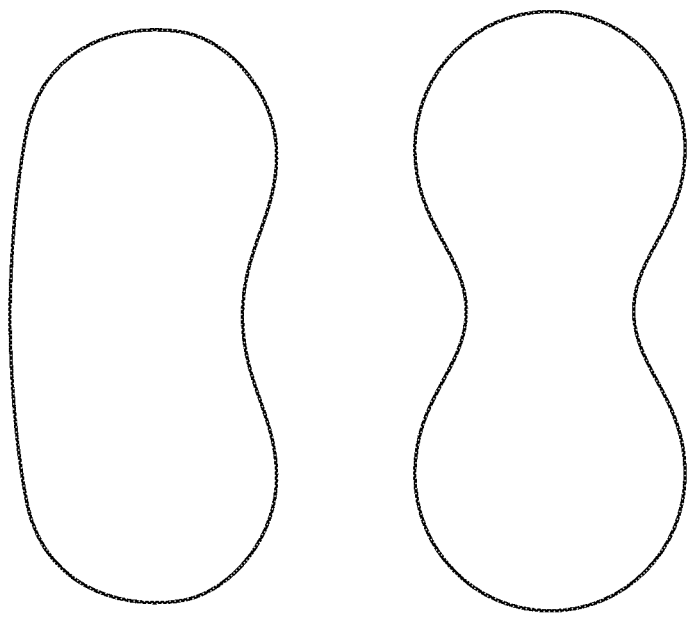
Figure 11A:
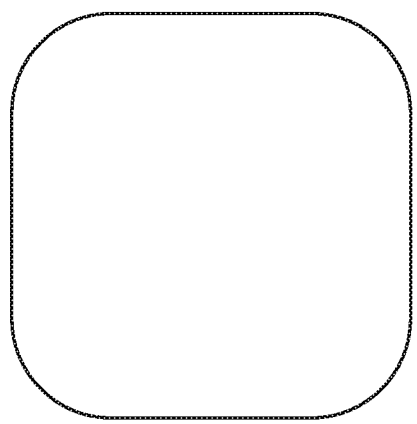
Figure 12A:
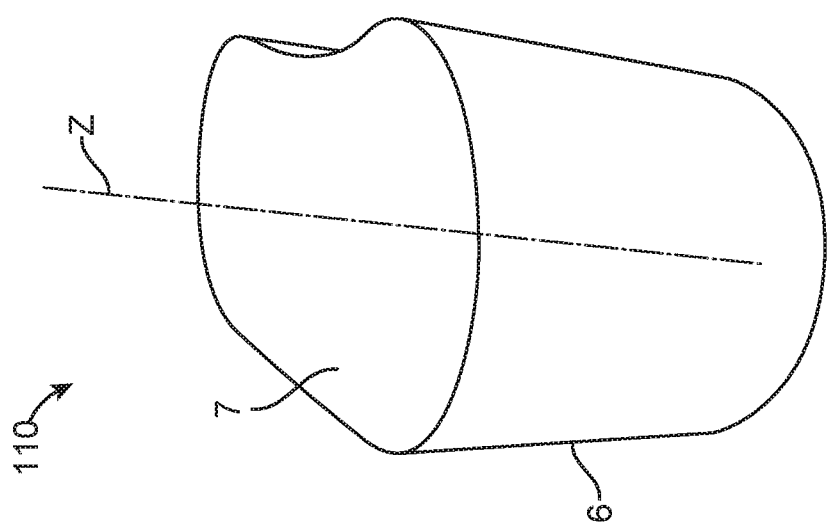
Figure 12B:
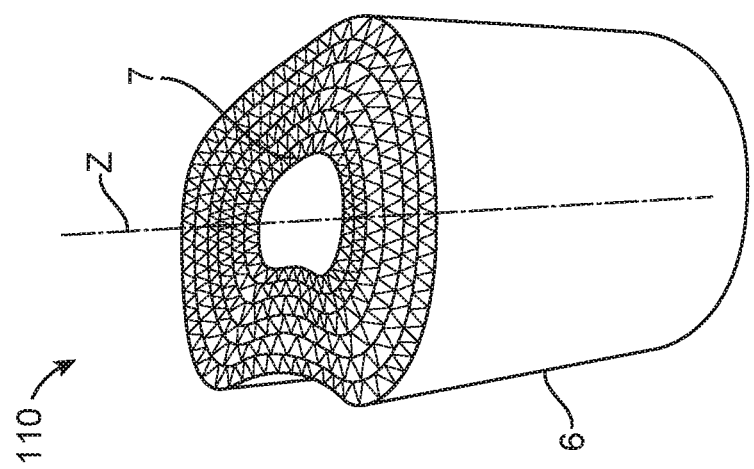
Figure 13D:
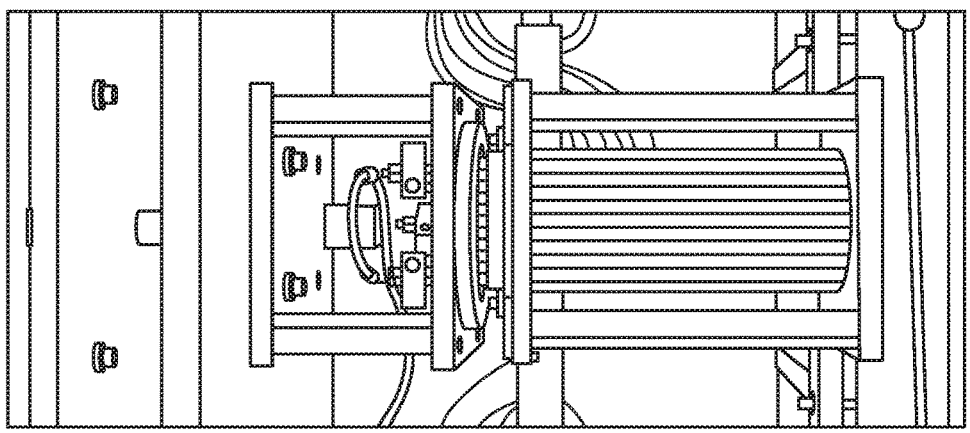
Figure 13C:
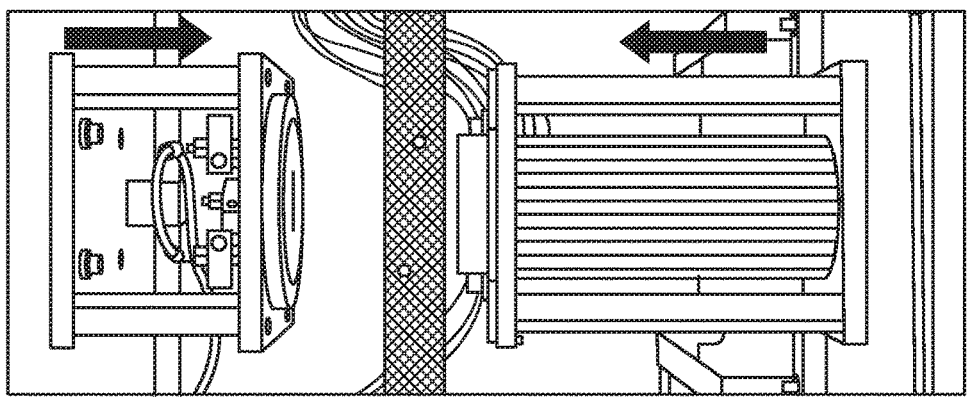
Figure 13B:
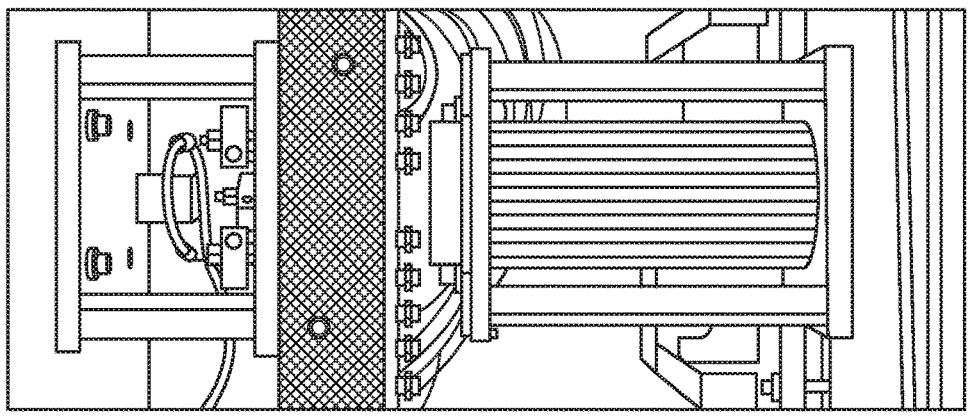
Figure 13A:
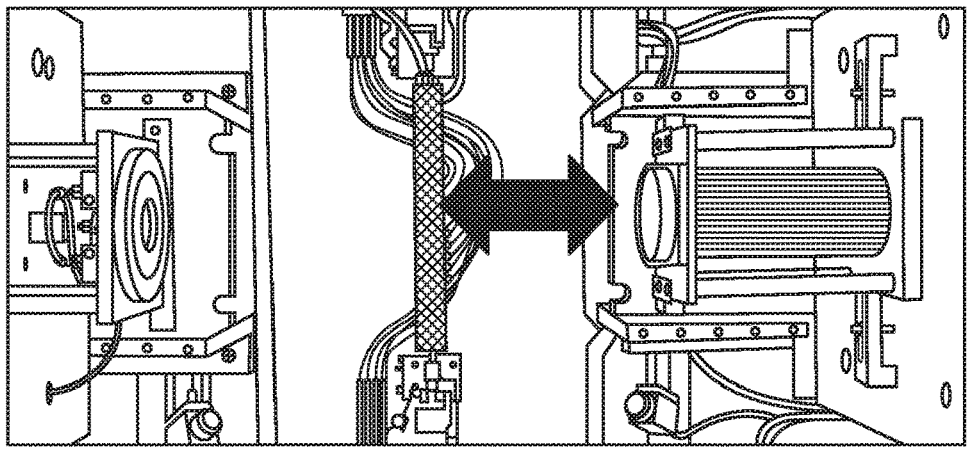
Figure 15A:
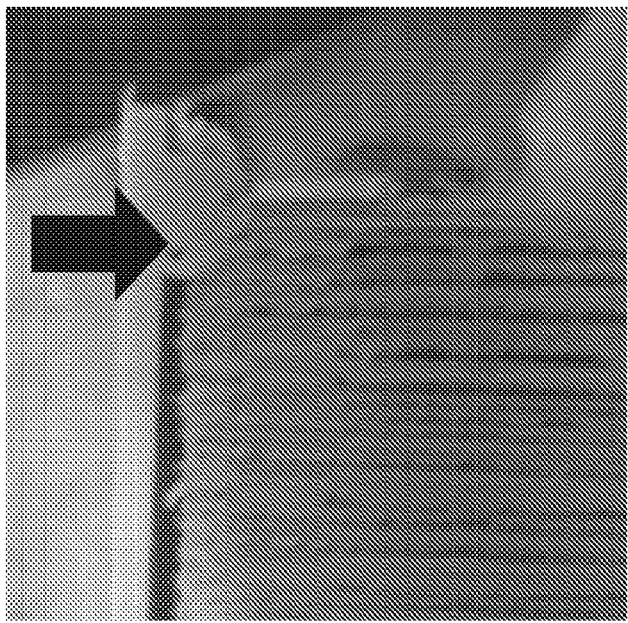
Figure 15B:
Figure 14:
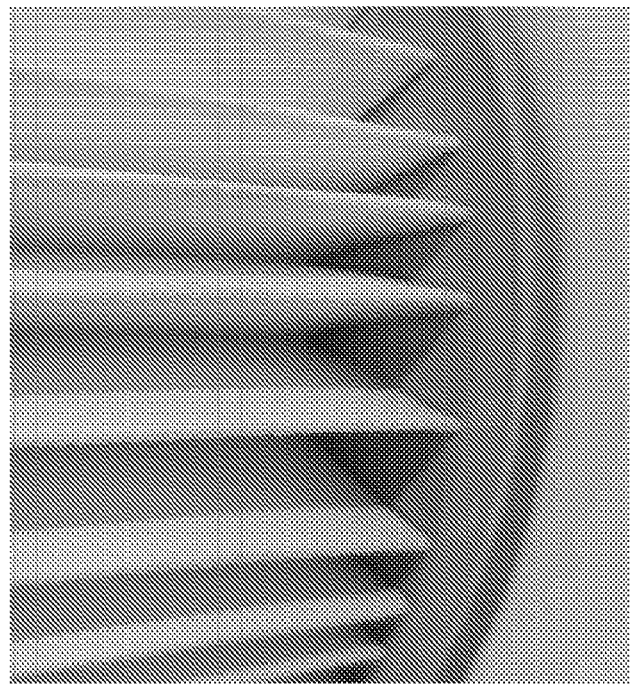

These and further aspects of the present disclosure will be explained in greater detail by way of example and with reference to the accompanying drawings in which:

FIG. 1 shows an exploded perspective view of an example of a filter element according to the present disclosure wherein the filter medium pack includes a pleated filter medium, FIG. 2A shows a perspective view of a filter element according to the present disclosure including an inwardly directed radial seal, FIG. 2B shows a perspective view of a filter element according to the present disclosure including an axial seal, FIG. 3 shows a cross sectional view of an example of a filter element according to the present disclosure wherein the filter medium pack includes a pleated filter medium, FIG. 4A to FIG. 4F show cross-sectional views of examples of seal carriers coupled to a filter medium pack including a pleated filter medium, FIG. 5 shows an exploded perspective view of an example of a filter element according to the present disclosure wherein the filter medium pack includes a fluted filter medium, FIG. 6 shows a perspective view of a filter element according to the present disclosure wherein the filter medium pack includes a coiled fluted filter medium, FIG. 7 shows a perspective view of a filter element according to the present disclosure wherein the filter medium pack includes a coiled fluted filter medium and wherein the seal arrangement includes an axial seal, FIG. 8 shows a perspective view of a further example of a filter element according to the present disclosure wherein the filter medium pack includes a coiled fluted filter medium and wherein the filter element includes an outwardly directed radial seal, FIG. 9A to FIG. 9C show cross sectional views of examples of filter elements according to the present disclosure wherein the filter medium pack includes a fluted filter medium, FIG. 10A to FIG. 10E show cross-sectional views of examples of seal carriers coupled to a filter medium pack including a fluted filter medium, FIG. 11A and FIG. 11B show examples of cross-sections between the circumferential face of the filter medium pack and a plane perpendicular to the longitudinal direction of the filter medium pack, FIG. 12A and FIG. 12B are perspective views illustrating two further examples of filter medium packs wherein the outer circumferential face has a convex portion, FIG. 13A to FIG. 13D shows a method of thermally welding a seal carrier to a filter medium pack, as further described in the Examples, FIG. 14 shows an exemplary image of a pleated filter medium pack after being thermally welded to a seal carrier, FIG. 15A and FIG. 15B shows an exemplary image of fluted filter medium pack after being thermally welded to a seal carrier, wherein FIG. 15A shows a detailed view of a portion of FIG. 15B; the arrow indicates where the flutes of the filter medium pack are embedded in the seal carrier.

The drawings of the figures are neither drawn to scale nor proportioned. Generally, like reference numbers illustrate like or corresponding structures throughout different views.

DETAILED DESCRIPTION

In one aspect, this disclosure describes a filter element for mounting in a housing of a filter system. The filter element includes a filter medium pack wherein the filter medium of the filter medium pack catches particles and impurities that are present in an incoming fluid flow. The fluid may be a liquid or a gas including, for example, air. When the filter element is mounted in the housing and the filter system is in operation, the filtered fluid should be kept separated from the incoming unfiltered fluid. Therefore, the filter element includes a seal arrangement configured for separating filtered from unfiltered fluid when the filter element is mounted in the housing and the filter system is operational. The filter element may be constructed as an element that is to be removed and replaced from a housing of the filter system at regular time intervals or when the filtering performance has dropped below a critical threshold level.

In another aspect, this disclosure describes methods of manufacturing the filter elements. In some embodiments, this disclosure describes filter elements manufactured by a production process involving a combination of a multi-material injection molding process and a thermal welding process. As further described herein, the multi-material injection molding process is used to form a seal arrangement including both a seal carrier and a seal, and the thermal welding process is used to couple the seal carrier with the filter medium pack.

In some embodiments, multi-material injection molding process is used to form both the seal and the seal carrier prior to attaching the seal carrier to the filter medium pack using a thermal welding process. In such embodiments, the seal, the seal carrier, and the thermal welding process must each be designed in a manner that the thermal welding does not cause damage to the seal or the filter medium pack.

In some embodiments, the multi-material injection molding process may be used to form the seal carrier prior to attaching the seal carrier to the filter medium pack using a thermal welding process and to form the seal after attachment of the seal carrier to the filter medium pack.

Filter Element

In reference now to the drawings, wherein like reference numbers illustrate like or corresponding structures throughout different views, examples of embodiments of a filter element 100 according to the invention are, for example, shown on FIG. 1, FIG. 2A, FIG. 2B, FIG. 5, FIG. 6, FIG. 7 and FIG. 8. As illustrated in these figures, the filter element 100 includes a filter medium pack 10, 110 and a seal arrangement. In some embodiments, the seal arrangement is preferably a molded single-structure seal arrangement. The seal arrangement is suitable for separating filtered from unfiltered fluid when the filter element 100 is operationally placed in a housing.

As shown in FIG. 1-FIG. 10, the seal arrangement includes a seal carrier 140, 240, 340, 440a-440f, 540, 640, 740, 840, 940, 1040a-1040e and a seal 120, 220a, 220b, 320, 420a-420f, 520, 620, 720, 820, 920, 1020a-1020e. The seal carrier 140, 240, 340, 440a-440f, 540, 640, 740, 840, 940, 1040a-1040e supports the seal 120, 220a, 220b, 320, 420a-420f, 520, 620, 720, 820, 920, 1020a-1020e, and, as further discussed below, the seal carrier 140, 240, 340, 440a-440f,

540, 640, 740, 840, 940, 1040a-1040e forms an interface between the filter medium pack 10, 110 and the seal 120, 220a, 220b, 320, 420a-420f, 520, 620, 720, 820, 920, 1020a-1020e. The seal 120, 220a, 220b, 320, 420a-420f, 520, 620, 720, 820, 920, 1020a-1020e may, in some embodiments, be a circumferential seal. As will be illustrated in exemplary embodiments discussed herein, the seal 120, 220a, 220b, 320, 420a-420f, 520, 620, 720, 820, 920, 1020a-1020e may be an outwardly directed radial seal, an inwardly directed radial seal, or an axial seal.

As further described herein, the seal 120, 220a, 220b, 320, 420a-420f, 520, 620, 720, 820, 920, 1020a-1020e is coupled to the seal carrier 140, 240, 340, 440a-440f, 540, 640, 740, 840, 940, 1040a-1040e by a multi-material injection molding manufacturing process so as to form a molded single-structure seal arrangement. The molded single-structure seal arrangement may have visual indicators that the seal arrangement was formed by a multi-material injection molding manufacturing process including, for example, visible feed points or visible ejector points. In some embodiments, a seam (also known as a weld line or a knit line) may be visible between the seal 120, 220a, 220b, 320, 420a-420f, 520, 620, 720, 820, 920, 1020a-1020e is and the seal carrier 140, 240, 340, 440a-440f, 540, 640, 740, 840, 940, 1040a-1040e. The absence of a visible feed point, an ejector point, or a seam does not, however, necessarily indicate that the molded single-structure seal arrangement was not formed by a multi-material injection molding manufacturing process.

Filter elements according to the present disclosure are not limited to any particular filter medium. For example, filter elements according to the first aspect of the disclosure may include a filter medium pack including a fluted filter medium, a pleated filter medium, or any other filter medium suitable for filtering the fluid. The fluted filter media may include coiled fluted filter media or stacked fluted filter media. Although particular embodiments are shown in the drawings with a pleated filter medium pack 10 (see, for example, FIG. 1, FIG. 3, and FIG. 4) or a fluted filter medium pack 110 (see, for example, FIG. 5-FIG. 10), unless specifically noted, the teachings with respect to a filter element 100 including a pleated filter medium pack 10 are applicable to a fluted filter medium pack 110, and the teachings with respect to a filter element 100 including a fluted filter medium pack 110 are applicable to a pleated filter medium pack 10.

Although a number of the drawings presented and discussed herein specifically address embodiments of a filter element for filtering a gas such as air, the filter elements described herein are not limited to filtering any particular fluid.

In some embodiments, the filter medium may include a wet laid media. In some embodiments the filter medium may include a dry formed or dry laid media. The filter medium may include any suitable combination of materials selected by the skilled artisan including, for example, polymers, fibers, binders, and additives. In an exemplary embodiment, the filter medium may include a wet laid non-woven filter medium including primarily cellulose fibers. In another exemplary embodiments, the filter medium may include a wet laid non-woven filter medium including cellulose fibers and synthetic fibers, wherein the filter medium includes up to 10% or up to 20% synthetic fibers. In yet another exemplary embodiment, the filter medium may include a dry laid media including spunbond synthetic fibers. Exemplary spunbond synthetic fibers include polyester fibers. In a further exemplary embodiment, the filter medium may include a multi-layer dry laid media including synthetic fibers. Each of these medias may, as noted above, include additional binders and/or additives. Additive compounds may add functionality, including but not limited to flame retardancy, oleophobicity, and/or hydrophobicity.

The filter medium pack 10 or 110 includes at least i) an outer circumferential face 6 extending in a longitudinal direction Z and ii) a first axial face 7 transverse to the longitudinal direction. The longitudinal direction is schematically indicated in FIG. 1 to FIG. 10 with a longitudinal axis Z. As further illustrated in FIG. 3 and in FIG. 9A to FIG. 9C, the first axial face 7 may be a side of the filter medium pack that is transverse to the longitudinal direction defined by the longitudinal axis Z. This first axial face 7 may be an inlet side or an outlet side for the fluid. For the embodiments shown in FIG. 3 and FIG. 9A to FIG. 9C, the two arrows indicate the direction of the fluid entrance flow and the fluid exit flow. In other embodiments, the fluid flow indicated on these figures may be inversed, depending on how the filter element is installed in the housing of the filter system.

The filter element 100 may preferably be configured for placement in a housing of a filter system. When the filter element 100 is operationally placed in the housing, the interface and/or the interaction between the seal 120, 220a, 220b, 320, 420a-420f, 520, 620, 720, 820, 920, 1020a-1020e of the filter element 100 and the housing prevents leakage during separation of filtered fluid from unfiltered fluid by the filter element 100.

For the embodiments shown in, for example, FIG. 1 and FIG. 5, the outer circumferential face 6 is extending in the longitudinal direction Z from the first axial face 7 to a second axial face 8, opposed to the first axial face 7. In these examples the first and second axial faces 7, 8 correspond to, respectively, a fluid inlet and fluid outlet. Depending on the specific shape of the filter medium pack, and as schematically illustrated on FIG. 9C, the filter medium pack does not always include a second axial face that is parallel with the first axial face. In this example, the first axial face 7 is a planar exit side for the filtered fluid while the unfiltered fluid is entering via a non-planar side of the filter medium pack 10, such as for example a curved side.

The seal 120, 220a, 220b, 320, 420a-420f, 520, 620, 720, 820, 920, 1020a-1020e is made of at least a first material and the seal carrier 140, 240, 340, 440a-440f, 540, 640, 740, 840, 940, 1040a-1040e is made of at least a second material. Generally, the second material is different from the first material. Examples of various materials that may be used for the seal and the seal carrier will be further discussed below.

When the filter element 100 shown in FIG. 1 is placed in a housing of a filter system, the fluid crosses the filter medium in a direction transverse to the longitudinal direction Z. For example, as illustrated with the arrows in FIG. 3, fluid to be filtered traverses through the outer circumferential face 6 of the filter medium pack 10 towards the interior of the hollow filter body formed by the pleated media and filtered fluid exits the filter medium pack 10 through a central opening in the first axial face 7 of the filter medium pack. This central opening in the first axial face 7 corresponds to the opening at the first end of the hollow filter body. Hence, these types of embodiments may include both an open end cap (including or consisting of the seal arrangement) and a closed end cap 70 at, respectively, the first and second end of the hollow filter body formed by the pleated filter medium.

The outer circumferential face 6 of the filter medium pack may have various shapes and the disclosure is not limited to any particular shape; indeed, the cross-section between the outer circumferential face 6 of the filter medium pack and a plane perpendicular to the longitudinal direction Z may for instance have a shape of a circle, an oval, an ellipse, a rounded square (as shown in FIG. 11A), an obround shape, a rectangle, or any other suitable shape for a filter medium pack. In FIG. 8, a perspective view is shown of an exemplary filter element 100 wherein the cross section of the outer circumferential face 6 with a plane perpendicular to the longitudinal direction Z has the shape of a rounded square.

In some exemplary embodiments, the cross-section between the circumferential face 6 of the filter medium pack 10, 110 and a plane perpendicular to the longitudinal direction Z forms a circumferential outer perimeter having one or more convex portions. Two particular shapes of an outer circumferential face 6 of the filter medium pack 10, 110 are shown on FIG. 11B wherein the top figure illustrates a shape having a convex perimeter portion and the bottom figure illustrates a peanut type of shape having two convex perimeter portions. In FIG. 12A and FIG. 12B, perspective views are shown of filter medium packs having an outer circumferential face 6 having a convex portion. Although a fluted filter medium pack 110 is indicated in FIG. 12, a pleated filter medium pack 10 could also be included in this configuration.

In the embodiments shown in FIG. 5 to FIG. 8, the filter medium pack 110 has also a second axial face 8, opposing the first axial face 7. This type of configuration is sometimes referred to as a "straight through flow configuration" or a "direct flow configuration." In general, in this context, the filter medium pack 110 of the filter element 100 includes an inlet face that allows a flow of unfiltered fluid to the enter the filter medium pack 110 and an opposite exit face that allows filtered fluid to exit the filter medium pack 110. Hence, the flow entering and the flow exiting the filter medium pack are in generally the same straight through direction.

In the embodiments shown in, for example, FIG. 5 to FIG. 8, the first axial face 7 and the second axial face 8 of the filter medium pack 110 correspond to a fluid inlet face and a fluid exit face, or vice-versa. Generally, the fluid inlet face and the fluid outlet face are planar, with the two faces parallel to one another. However, variations from this, for example non-planar faces, are possible.

In FIG. 9A to FIG. 9C, cross-sectional views are shown of exemplary embodiments of filter elements 100 wherein the filter medium pack 110 includes a fluted filter medium. The two arrows indicate exemplary flow directions for the fluid entering and exiting the filter medium pack 110. In FIG. 9C an example is shown where the first axial face 7 is a planar side but where there is no opposing planar second axial face.

In some embodiments, an outer surface of an outer layer of the coiled fluted filter medium may form the outer circumferential face 6 of the filter medium pack 110. In other words, a portion of the facing sheet of the fluted filter material discussed above is forming the outer circumferential face 6.

In some embodiments, the width of the first axial side 442a-442f, 1042a-1042e of the seal carrier 140, 240, 340, 440a-440f, 540, 640, 740, 840, 940, 1040a-1040e may preferably be kept as small as possible such that circumferential edge of the first axial face 7 that is being coupled to the first axial side 442a-442f, 1042a-1042e is as small as possible. Indeed, as the axial face 7 is an inlet or an outlet for the fluid, the covering of the inlet or outlet by the first axial side 442a-442f, 1042a-1042e of the seal carrier may influence the fluid flow and/or limit the filtering capacity of the filter medium pack 10, 110.

In the embodiments shown in, for example, FIG. 5 to FIG. 8, filter elements 100 include a fluted filter medium that is formed by coiled layers of fluted filter material. Each of the layers of fluted filter material includes inlet flutes and outlet flutes oriented essentially parallel with the longitudinal direction Z of the filter medium pack. Flute entrances of the inlet flutes or flute exits of the outlet flutes of at least one outer layer of the coiled layers of fluted filter material are blocked by the first axial side 1042a-1042e of the seal carrier 540, 640, 740, 840, 940, 1040a-1040e. In some embodiments, flute entrances of the inlet flutes or flute exits of the outlet flutes of at least the outer two layers of the coiled layers of fluted filter material are blocked by the first axial side 1042a-1042e of the seal carrier 540, 640, 740, 840, 940, 1040a-1040e. If the first axial face is an inlet face for receiving the unfiltered fluid then entrances of the inlet flutes are blocked by the first axial side 1042a-1042e of the seal carrier 540, 640, 740, 840, 940, 1040a-1040e. On the other hand, if the first axial face 7 is an outlet face for outputting the filtered fluid, then exits of the outlet flutes are blocked by the first axial side 1042a-1042e of the seal carrier 540, 640, 740, 840, 940, 1040a-1040e.

The filter element 100 is characterized by the use of two different manufacturing processes for manufacturing the filter element 100, more specially the manufacturing processes for coupling the seal 120, 220a, 220b, 320, 420a-420f, 520, 620, 720, 820, 920, 1020a-1020e to the seal carrier 140, 240, 340, 440a-440f, 540, 640, 740, 840, 940, 1040a-1040e and the manufacturing process for coupling the seal carrier 140, 240, 340, 440a-440f, 540, 640, 740, 840, 940, 1040a-1040e to the filter medium pack 10, 110. As further described herein, a multi-material injection molding manufacturing process is used to couple the seal 120, 220a, 220b, 320, 420a-420f, 520, 620, 720, 820, 920, 1020a-1020e to the seal carrier 140, 240, 340, 440a-440f, 540, 640, 740, 840, 940, 1040a-1040e and provides a molded single-structure seal arrangement. As further described herein, a thermal welding process is used to couple the seal carrier 140, 240, 340, 440a-440f, 540, 640, 740, 840, 940, 1040a-1040e to the filter medium pack 10, 110.

In some embodiments, as shown in FIG. 5 and FIG. 9B, a supporting frame 60 may be coupled to the second axial face 8. When the filter medium pack 10, 110 is a fluted filter medium pack 110, the supporting frame 60 may be configured to prevent the coiled layers of the filter medium pack 110 from moving in the longitudinal direction Z. Typically, the supporting frame 60 includes a rib portion 62 that blocks the movement of the coiled layers in the longitudinal direction. As further described herein, a second thermal welding process may be used to couple the supporting frame 60 to the filter medium pack 10, 110.

In some embodiments, as shown for example on FIG. 6 and FIG. 9A, the seal carrier 640, 940 may include one or more ribs 45 located in a plane essentially perpendicular to the longitudinal direction Z. When the filter medium pack 10, 110 is a fluted filter medium pack 110, the one or more ribs 45 may be arranged and coupled to the first axial face 7 to prevent the coiled layers from moving in the longitudinal direction Z. Advantageously, with these type of embodiments no additional supporting frame is required to be coupled to the second axial face 8 of the filter medium pack 10, 110 as is the case for embodiments as shown in FIG. 5 and FIG. 9B.

In embodiments as shown for example in FIG. 5 and FIG. 6, the seal carrier 540, 640 includes a radial circumferential side 41 extending in the longitudinal direction Z. The seal 520, 620 surrounds this radial circumferential side 41 of the seal carrier 540, 640, forming an outwardly directed radial seal. In an exemplary embodiment, the seal 520, 620 may be formed around the radial circumferential side 41 of the seal carrier 540, 640.

In some embodiments, as shown in FIG. 7 and FIG. 10E, the seal 720, 1020e is an axial seal. To form an axial seal, as illustrated in these figures, the seal 720, 1020e may be coupled to an opposing circumferential border 44 of the seal carrier. As schematically shown in FIG. 10E, the opposing circumferential border 44 of the seal carrier 740, 1040e is generally a border that is parallel with the circumferential border 1042e of the seal carrier that is coupled by thermal welding to the first axial face 7 of the filter medium pack 10. In these embodiments, as shown in FIG. 10E, the circumferential border 1042e and the opposing circumferential border 44 correspond, for example, to two parallel annuli.

Various embodiments of seal carriers 440a-440f, 1040a-1040e that are coupled to a filter medium pack 10, 110 are schematically illustrated in FIG. 4A to FIG. 4E and in FIG. 10A to FIG. 10E. In these cross-sectional figures, illustrating only partly the filter element 100, the seal carrier 440a-440f, 1040a-1040e is represented by a hatched area and the filter medium pack 10, 110 is represented as a dotted area. The seal carrier 440a-440f, 1040a-1040e includes a number of sides that may differ from one embodiment to another embodiment. As illustrated in these figures, the filter element 100 according to the first aspect of the disclosure is characterized in that the seal carrier 440a-440f, 1040a-1040e includes at least a first axial side 442a-442f, 1042a-1042e that axially couples with the first axial face 7 of the filter medium pack 10. The first axial side 442a-442f, 1042a-1042e may be coupled to at least a circumferential portion of the first axial face 7 of the filter medium pack by a thermal welding manufacturing process. In other words, the first axial side 442a-442f, 1042a-1042e of the seal carrier 440a-440f, 1040a-1040e may be a coupling surface that generally is essentially parallel with the first axial face 7 of the filter medium pack. The extent of the circumferential portion of the axial face 7 of the filter medium pack that is being coupled to the first axial side 442a-442f, 1042a-1042e of the seal carrier may depend on the type of filter medium pack 10, 110. For example, a filter medium pack 10 including a pleated medium, as shown, for example, in FIG. 1, FIG. 3, and FIG. 4, and a filter medium pack 110 including a fluted medium, as shown, for example, in FIG. 5 and FIG. 8-FIG. 10, may have different circumferential portions of the first axial face 7 of the filter medium pack 10, 110 being covered by the first axial side 442a-442f, 1042a-1042e of the seal carrier 140, 240, 340, 440a-440f, 540, 640, 740, 840, 940, 1040a-1040e. Similarly, only a portion of the first axial side 442a-442f, 1042a-1042e of the seal carrier 440a-440f, 1040a-1040e may be a coupling surface; that is, only a portion of the first axial side 442a-442f, 1042a-1042e of the seal carrier 440a-440f, 1040a-1040e may couple with the first axial face 7 of the filter medium pack.

In some embodiments, as shown in FIG. 10A to FIG. 10C, the seal carrier 1040a-1040e, represented by a hatched area, includes a tubular shaped extension 43 extending in the longitudinal direction Z, thereby forming an entrance channel for receiving unfiltered fluid. In these embodiments, the seal 1020a-1020e is coupled to an outer circumferential surface of the tubular shaped extension 43 so as to form an outwardly directed radial seal. The coupling of the seal 1020a-1020e to the outer circumferential surface of the tubular shaped extension 43 may preferably be obtained by a multi-material injection molding manufacturing process so as to obtain a molded single-structure seal arrangement.

Examples of Embodiments with Pleated Filter Media

In some embodiments, the filter element 100 includes a filter medium pack 10 including a pleated filter medium.

In FIG. 1, an exploded view is shown of an embodiment of a filter element 100 according to the first aspect of the present disclosure. The filter medium pack 10 of the illustrated filter element 100 includes pleated filter media having a plurality of pleats placed in a closed loop, in this example an annulus, such that a hollow filter body is formed extending in the longitudinal direction Z. Hence, the hollow filter body has a first opening and a second opening at, respectively, a first end and a second end of the hollow filter body. The pleats are, for example, formed by folding a sheet of filter paper. In the embodiment shown on FIG. 1, the hollow filter body is a hollow-shaped cylinder. A plurality of outer tips of the plurality of pleats forms an outer circumferential perimeter of the hollow filter body. In this embodiment, the outer circumferential face 6 of the filter medium pack 10 corresponds to this circumferential perimeter formed by the outer tips of the pleats, and the first axial face 7 and second axial face 8 of the filter medium pack 10 correspond, respectively, to the first and the second end of the hollow filter body.

In the embodiment shown in FIG. 1 and FIG. 4A, the seal carrier 140, 440a only provides a support for the seal 120, 420a, but the first axial side 442a of the seal carrier also provides an open end cap for the first end of the hollow filter body. Indeed, by coupling the first axial side 442a of the seal carrier 140, 420a to the end of the hollow filter body by thermal welding, the pleats of the filter medium pack 10 are closed off at a first end. As schematically illustrated in FIG. 3, a closed end cap 70 may be further coupled to the second end of the hollow filter body thereby not only closing off the pleats of the filter medium pack 10 at the second end but also entirely closing the second opening at the second end of the hollow filter body such that filtered fluid may only exit the filter element 100 through the first opening at the first end of the hollow filter body.

In some embodiments including when pleated media form a hollow filter body, as schematically shown in, for example, FIG. 1 and FIG. 3, the filter element 100 includes a closed end cap 70. The closed end cap 70 may be coupled to a second axial face 8 of the filter medium pack 10 by a second thermal welding manufacturing process. By using thermal welding to couple the closed end cap 70 to the filter medium pack 10 in addition to using thermal welding to couple the seal arrangement to the filter medium pack 10, the overall manufacturing process may be accelerated. By using two thermal welding manufacturing processes, no additional non-thermal welding manufacturing processes such as molding or gluing that may require additional manufacturing apparatuses or curing times are needed to couple the filter medium pack 10 of a filter element 100 that includes a closed end cap 70.

In other embodiments wherein the filter medium pack 10 includes pleated filter media, an outer liner may be provided around the hollow filter body formed by the pleated filter media and in these embodiments, the outer liner forms the outer circumferential face 6 of the filter medium pack 10.

In FIG. 4A to FIG. 4E, cross-sectional views are shown of examples of seal arrangements used in combination with a filter medium pack 10 that includes a pleated filter medium. The reference "W" in the figures indicates the zone where the first axial side 442a-442e of the seal carrier 440a-440e is coupled to the first axial face 7 of the filter medium pack 10 by thermal welding. As discussed above, in embodiments that include a pleated filter medium pack 10, the first axial face 7 may correspond to the first end of the hollow filter body formed by the pleated filter medium.

The exemplary embodiments shown in FIG. 1 and FIG. 4A illustrate a filter element wherein the seal carrier 140, 440a includes, in addition to the first axial side 442a, a radial circumferential side 41 enclosing, or at least partly enclosing, the outer circumferential face 6 of the filter medium pack 10. In some embodiments, as shown in FIG. 1 and FIG. 4A, the seal 120, 420a may surround the radial circumferential side 41 of the seal carrier 140, 440a so as to form an outwardly directed radial seal; that is, the sealing surface of the seal 120, 420a is outwardly facing. The seal 120, 420a may preferably be coupled to the radial circumferential side 41 of the seal carrier 140, 440a by a multi-material injection molding manufacturing process so as to form a molded single-structure seal arrangement.

In FIG. 4F, a cross-sectional view is shown of an embodiment wherein the seal 420 is surrounding the radial circumferential side 41 of the seal carrier 440f so as to form an outwardly directed radial seal. In this embodiment, as schematically illustrated in FIG. 4F, the cross section of the seal carrier 440f with a plane including the longitudinal axis Z, has a T-shape.

In other embodiments, as illustrated in FIG. 2B and FIG. 4E, the seal 220b, 420e of the seal carrier 240, 440e forms an axial seal. Indeed, in these embodiments, the seal carrier 240, 440e includes a second axial side 44 opposing the first axial side 442e that is coupled to the first axial face 7 of the filter medium pack 10. The seal 220b, 420e is coupled to the second axial side 44 by a multi-material injection molding manufacturing process.

In some embodiments, the radial circumferential side 41 of the seal carrier 140, 240, 340, 440a-440f, 540, 640, 740, 840, 940, 1040a-1040e entirely encloses the outer circumferential face 6 of the filter medium pack 10, thereby forming a protective shell around the filter medium pack 10.

In FIG. 4B, a cross-sectional view is shown of part of an embodiment of a filter element 100 wherein the seal carrier 440b does not include a radial circumferential side circumscribing the outer circumferential face 6 of the filter medium pack 10. Instead, in this embodiment, the seal carrier 440b includes, besides the first axial side 442b, also a tubular shaped extension 43 extending co-axially with the central opening at the first end of the hollow filter body. Hence, the tubular shaped extension 43 is forming an exit channel for exiting filtered fluid from the interior of the hollow filter body. As schematically shown on FIG. 4B, in this example, the seal 420b is coupled to an inner circumferential surface of the tubular shaped extension 43. In this way, an inwardly directed radial seal is formed. The coupling of the seal 420b to the inner circumferential surface of the tubular shaped extension 43 may preferably be obtained by a multi-material injection molding manufacturing process so as to obtain a molded single-structure seal arrangement.

In FIG. 4C, an embodiment similar to the embodiment of FIG. 4B is shown wherein the tubular shaped extension 43 of the seal carrier is extending inside the hollow filter body, instead of extending outside the hollow filter body as is the case with the embodiment shown in FIG. 4B.

In alternative embodiments, the tubular shaped extension 43 of the seal carrier 440a-440f may form an entrance channel for bringing unfiltered fluid to the interior of the hollow filter body such that the fluid may subsequentially traverse the pleated media.

In further embodiments having a seal carrier 440b as shown in FIG. 4B, the seal 420b may also be coupled to an outer circumferential surface of the tubular shaped extension 43 so as to form an outwardly directed radial seal.

In FIG. 2A and FIG. 4D, a further embodiment is shown wherein the seal 220a, 420d is forming an inwardly directed radial seal. In this embodiment, the seal carrier 240, 440d has a central opening configured for exiting filtered fluid or for receiving unfiltered fluid. In this embodiment, the seal 220a, 420d may be coupled by the multi-component manufacturing process to an inner circumferential surface of the central opening of the seal carrier, thereby forming an inwardly directed radial seal.

In some embodiments, the filter medium may be embedded by at least 0.5 mm, at least 1 mm, at least 1.5 mm, or at least 2 mm into the seal carrier 140, 240, 340, 440a-440f and/or the material of the seal carrier 140, 240, 340, 440a-440f may impregnate at least 0.5 mm, at least 1 mm, at least 1.5 mm, or at least 2 mm of the pleats of the filter medium pack 10.

Examples of Embodiments with Fluted Filter Media

In some embodiments, the filter element 100 includes a filter medium pack 110 including fluted filter media also known as Z-filter media.

With reference to the drawings, in FIG. 5, an exploded view is shown of an embodiment of a filter element 100 including a filter medium pack 110 including fluted filter media. In the embodiment shown in FIG. 5, an outer surface of the fluted filter media forms the outer circumferential face 6 of the filter medium pack 110. Perspective views of various embodiments of filter elements wherein the filter medium pack includes coiled fluted filter media are illustrated on FIG. 6 to FIG. 8.

In some embodiments, the fluted filter media may be formed by coiled layers of fluted filter material. Each of these coiled layers includes inlet flutes and outlet flutes oriented essentially parallel with the longitudinal direction Z. Flute entrances of the inlet flutes or flute exits of the outlet flutes of at least an outer layer of the coiled layers are blocked where the first axial side 442a-442f, 1042a-1042e of the seal carrier 140, 240, 340, 440a-440f, 540, 640, 740, 840, 940, 1040a-1040e is coupled to the first axial face 7 of the filter medium pack 110. In some embodiments, flute entrances of the inlet flutes or flute exits of the outlet flutes of at least the outer two layers of the coiled layers are blocked by the coupling of the first axial side 442a-442f, 1042a-1042e of the seal carrier 140, 240, 340, 440a-440f, 540, 640, 740, 840, 940, 1040a-1040e to the first axial face 7 of the filter medium pack 110.

Cross sectional views of examples of filter element configurations including fluted filter media are further shown in FIG. 9A to FIG. 9C. The two arrows in each of these figures indicate an exemplary flow direction for the fluid. The seal carrier 140, 240, 340, 440a-440f, 540, 640, 740, 840, 940, 1040a-1040e may be coupled to the filter medium pack 110 in any suitable configuration. Various examples of seal carriers 140, 240, 340, 440a-440f, 540, 640, 740, 840, 940, 1040a-1040e coupled to fluted filter medium packs 110 are shown in FIG. 10A to FIG. 10C. In these cross sectional views, the hashed areas and the dotted areas represent, respectively, the seal carrier 1040a-1040e and the filter medium pack 110. The reference "W" indicates a thermal welding zone.

Exemplary fluted filter media and filter medium packs including fluted filter media including coiled Z-filter media are disclosed in U.S. Pat. Nos. 6,350,291 and 7,396,376 and European Patent Publication No. 3 680 002. One construction type of Z-filter media uses two specific media components that are joined together to form the media construction.

The two components are a fluted, typically corrugated, media sheet and a facing media sheet. The facing media sheet is typically non-corrugated. The fluted media sheet and the facing media sheet may be used to define media having a set of parallel inlet flutes and a set of parallel outlet flutes. After securing the fluted sheet together with the facing sheet a layer of fluted filter material is obtained, and the fluted filter material includes the set of inlet and the set of outlet flutes.

By coiling the layer of fluted filter material, a filter body is formed having an outer circumferential surface formed by an outer layer of the coiled fluted filter media and having an axial inlet face for receiving unfiltered fluid and an axial outlet face for exiting filtered fluid. The flutes in each of the coiled layers are oriented essentially parallel with the longitudinal direction of the filter medium pack. As further described in U.S. Pat. Nos. 6,350,291 and 7,396,376, with respect to Z-filter media, "coiled" is meant to refer to a filter medium pack 110 formed by coiling a strip of a fluted filter media to form the filter medium pack 110. Such coiled media may be made in a variety of shapes including: round or cylindrical; oval, for example, racetrack; square; or rectangular with rounded corners; and, the coiled media may even be configured in conical or similar arrangements. Examples of selected shapes are described in U.S. Pat. No. 6,350,291.

Additionally or alternatively, all or a portion of the fluted filter media may be stacked to create a filter media pack. Exemplary stacked fluted filter media arrangements are described in U.S. Pat. Nos. 5,820,646 and 8,292,983. Including, for example, when the filter media pack includes stacked fluted filter media, the outer circumferential surface of the filter body may be rectangular.

In some embodiments, the outer circumferential surface of the filter body forms the outer circumferential face 6 of the filter medium pack 110. In other embodiments a protective layer may be placed around the circumferential surface of the filter body such that the outer surface of the protective layer forms the outer circumferential face 6 of the filter medium pack 110. In the embodiments illustrated in FIG. 5 to FIG. 8, the axial inlet and the axial outlet of the filter body correspond to, respectively, the first axial face 7 and the second axial face 8 of the filter medium pack 110.

Each of the layers of coiled fluted material include a set of inlet flutes and a set of outlet flutes. The set of inlet flutes are open at the axial inlet side of the filter body in order to receive the unfiltered fluid and the inlet flutes are closed at the axial outlet side of the filter body. On the other hand, the set of outlet flutes are closed at the axial inlet side and open at the axial outlet side to allow the filtered fluid to exit the filter body. In this way, the fluid is forced to make a Z-shaped trajectory to flow from the axial inlet side to the axial outlet side.

In the embodiment shown in FIG. 5 and FIG. 10B, the circumferential portion of the first axial face 7 of the filter medium pack 110 that is coupled by thermal welding to the first axial side 1042*b* of the seal carrier 540, 1040*b* corresponds to a circumferential edge portion of the axial face 7 of the filter medium pack 110. Generally, this circumferential edge portion includes at least an axial side of the outer layer of the coiled fluted filter medium. In other words, at least the outer layer of coiled filter media cannot be used for filtering purposes. In some embodiments, not only the outer layer but one or more successive layers of the coiled filter media may be sacrificed to allow a more secure axial coupling between the first axial side 1042*b* of the seal carrier and the first axial face 7 of the filter medium pack.

With further reference to FIG. 5 and FIG. 10, in some embodiments, the first axial side 1042*a*-1042*e* of the seal carrier 540, 1040*a*-1040*e* may be constructed as an axial circumferential border. Indeed, the portion of the first axial face 7 of the filter medium pack 110 being coupled to the first axial side 1042*a*-1042*e* of the seal carrier 540 may be kept as small as possible while providing a secure coupling to limit the reduction in the fluid flow through the first axial face 7 of the filter medium pack 110.

Due to the axial coupling between the seal carrier 540, 1040*a*-1040*e* and the filter medium pack 110, flute entrances of the inlet flutes or flute exits of the outlet flutes of at least an outer layer of the coiled layers are blocked by the first axial side 1042*a*-1042*e* of the seal carrier. Preferably, to obtain a secure coupling between the seal carrier 540, 1040*a*-1040*e* and the filter medium pack 110, flute entrances of the inlet flutes or flute exits of the outlet flutes of at least the outer two layers of the coiled layers are blocked by the first axial side 1042*a*-1042*e* of the seal carrier 540, 1040*a*-1040*e*. On the other hand, the number of successive layers being blocked by the first axial side 1042*a*-1042*e* of the seal carrier 540, 1040*a*-1040*e* should also be limited to ensure optimum operation of the filter element 100. When the filter medium pack filter medium pack 110 includes coiled fluted media layers, the number of successive layers being blocked by the first axial side 1042*a*-1042*e* of the seal carrier 540, 1040*a*-1040*e* should be less than ten layers, preferably less than eight layers, more preferably less than six layers.

The embodiments shown in, for example, FIG. 6 and FIG. 10A illustrate filter elements 100 wherein the seal carrier 640, 1040*a* includes, in addition to the first axial side 1042*a* also a radial circumferential side 41 circumscribing the outer circumferential face 6 of the filter medium pack 110. In these embodiments, the seal 620, 1020*a* is surrounding the radial circumferential side 41 of the seal carrier 640, 1040*a* so as to form an outwardly directed radial seal.

In other embodiments, as illustrated in FIG. 7 and FIG. 10E, the seal 720, 1020*e* is forming an axial seal. The seal 720, 1020*e* may be coupled to a second axial side 44, opposing the first axial side 1042*e*, by a multi-material injection molding manufacturing process to form a molded single-structure seal arrangement as further described herein. As schematically shown in FIG. 10E, the second axial side 44 of the seal carrier is generally a side that is parallel with the first axial side 1042*e* of the seal carrier 1040*e*.

In FIG. 10B and FIG. 10C cross-sectional views are shown of seal arrangements wherein the seal carrier 1040*b*, 1040*c* includes a tubular shaped extension 43 extending in the longitudinal direction Z, thereby forming an entrance channel for receiving unfiltered fluid. In such embodiments, the seal 1020*b*, 1020*c* may be coupled to an outer circumferential surface of the tubular shaped extension 43 so as to form an outwardly directed radial seal. The coupling of the seal 1020*b*, 1020*c* to the outer circumferential surface of the tubular shaped extension 43 may be obtained by a multi-material injection molding manufacturing process so as to obtain a seal arrangement that is a molded single-structure seal arrangement.

In FIG. 10A, an embodiment is shown wherein the seal carrier include the tubular shaped extension 43 and a radial circumferential side 41 circumscribing the outer circumferential face 6 of the filter medium pack 110. This radial circumferential side 41 may serve as a protection surface for the filter medium pack 110.

In FIG. 10D, an embodiment is shown wherein the seal 1020*d* forms an inwardly directed radial seal. Indeed, in this embodiment, the seal carrier 1040d has, for example, the shape of a ring, and the seal is located on an inner circumferential surface of the ring-shaped seal carrier 1040d.

In some embodiments including coiled fluted media, as illustrated in FIG. 5, the filter element 100 includes a supporting frame 60 coupled to the second axial face 8 of the filter medium pack 10. This supporting frame 60 may be configured to prevent the coiled layers from moving in a direction parallel with the longitudinal direction Z. Indeed, when in operation, due to the flow of the fluid, the layers might start moving in the longitudinal direction. As illustrated on FIG. 5, the supporting frame 60 includes for example a circumferential border 61 and a rib 62. The rib 62 may be positioned such that the coiled layers are blocked from moving along the longitudinal direction of the filter medium pack.

In some embodiments, the supporting frame 60 may be coupled to the second axial face 8 of the filter medium pack 110 by a second thermal welding manufacturing process, as further described herein. By using two thermal welding manufacturing processes, no additional non-thermal welding manufacturing processes such as molding or gluing that may require additional manufacturing apparatuses or curing times are needed to couple the filter medium pack 110 of a filter element 100 that includes ae supporting frame 60.

With reference to FIG. 6, in some embodiments, the seal carrier 640 may include one or more ribs 45. The embodiment shown in FIG. 6 includes one rib 45. If included, the one or more ribs 45 may be arranged and coupled to the first axial face 7 of the filter medium pack 110 to prevent the coiled layers from moving in the longitudinal direction Z. The coupling of the one or more ribs 45 with the first axial face 7 of the filter medium pack 110 may preferably obtained by thermal welding, as further discussed herein.

One advantage of the embodiment shown in FIG. 6 when compared to the embodiment shown in FIG. 5, is that no extra supporting frame 60 is required to be coupled to the second axial face 8 of the filter medium pack 110. Without wishing to be bound by theory, including one or more ribs 45 as an integral part of the seal carrier 640 is expected to prevent the media from telescoping. At the time of the invention, telescoping was typically prevented by the inclusion of a supporting frame 60 coupled to the second axial face 8. Thus, if the one or more ribs 45 prevent the media from telescoping without the addition of a supporting frame, one fewer plastic component may be included, making the filter element 10 cheaper and easier to manufacture.

Materials of the Seal, Seal Carrier, and Closed End Cap

The seal arrangement includes a seal 120, 220a, 220b, 320, 420a-420f, 520, 620, 720, 820, 920, 1020a-1020e and a seal carrier 140, 240, 340, 440a-440f, 540, 640, 740, 840, 940, 1040a-1040e. The seal 120, 220a, 220b, 320, 420a-420f, 520, 620, 720, 820, 920, 1020a-1020e is made of at least a first material and the seal carrier 140, 240, 340, 440a-440f, 540, 640, 740, 840, 940, 1040a-1040e is made of at least a second material. Generally, the second material is different from the first material. In some embodiments, the seal 120, 220a, 220b, 320, 420a-420f, 520, 620, 720, 820, 920, 1020a-1020e and/or the seal carrier 140, 240, 340, 440a-440f, 540, 640, 740, 840, 940, 1040a-1040e, may be made of more than one material.

Because the seal 120, 220a, 220b, 320, 420a-420f, 520, 620, 720, 820, 920, 1020a-1020e prevents leakage during separation of filtered fluid from unfiltered fluid by the filter element 100 when the filter element 100 is operationally placed in the housing, and the seal carrier 140, 240, 340, 440a-440f, 540, 640, 740, 840, 940, 1040a-1040e must support the seal and be coupled to the filter medium pack 10, 110, the seal is typically formed of a softer material, examples of which are provided herein, and the seal carrier is typically formed of a harder material. Examples of each of those materials are further described herein.

If the filter element 100 includes a closed end cap 70, the closed end cap may be made of at least a third material. In some embodiments, the closed end cap 70 may be made of more than one material. However, in some embodiments, the closed end cap may preferably be made of the same material or materials as the seal carrier. Using the same material for the seal carrier and the closed end cap is expected to provide increased efficiencies in manufacturing of the filter element 100.

In some embodiments, the transition temperature of the first material (or combination of materials) used to form seal 120, 220a, 220b, 320, 420a-420f, 520, 620, 720, 820, 920, 1020a-1020e may be greater than the transition temperature of the second material (or combination of materials) used to form the seal carrier 140, 240, 340, 440a-440f, 540, 640, 740, 840, 940, 1040a-1040e. In this way, when heat is applied to the seal arrangement during the thermal welding manufacturing process, as further described herein, and the processing temperature is above the transition temperature of the second material, the seal is less likely to be deformed. The difference in transition temperature between the materials for the seal and the seal carrier may be selected by a person having skill in the art based on the geometry of the seal arrangement, the heat source used, and the processing temperature.

When the material or combination of materials includes a polymeric fraction as a single phase in the amorphous state (including, for example, a polystyrene (PS) or a polycarbonate (PC)), the "transition temperature" of the material is the midpoint temperature ($T_{mg}$) determined using Differential Scanning Calorimetry (DSC) according to ASTM D3418-99, entitled "Standard Test Method for Transition Temperatures of Polymers by Differential Scanning Calorimetry." The midpoint temperature ($T_{mg}$) is used as a representation of the glass transition temperature ($T_g$) because the $T_g$ is, in practice, a temperature range. Any suitable instrument may be used to conduct DSC; however, in an exemplary embodiment, a DSC3+ (Mettler-Toledo AG, Schwerzenbach, Switzerland) with a FRS 6+ sensor may be used.

When the material or materials include a semi-crystalline polymeric material or any other materials displaying more than a single polymer phase (including, for example, a polypropylene (PP) or a polyethylene (PE)), the "transition temperature" of the material is the final temperature at which the elastic modulus (G') and the loss modulus (G") intersect, when G' and G" are plotted against temperature from 0° C. to a temperature at which the polymer is in a melt state. G' and G" are defined per ASTM D4092-01, entitled "Standard Terminology for Plastics: Dynamic Mechanical Properties." The rise of tan δ may be used to characterize a system under transition towards the melt flow zone. Herein G' and G" are determined using temperature sweeping dynamic mechanical analysis (DMA) according to ASTM D4440-15, entitled "Standard Test Method for Plastics: Dynamic Mechanical Properties Melt Rheology" using a mechanical spectrometer to measure forced constant amplitude fixed frequency shear oscillation, as further described in ASTM D4065-12, entitled "Standard Practice for Plastics: Dynamic Mechanical Properties: Determination and Report of Procedures." Any suitable dynamic mechanical analyzer may be used; however, in an exemplary embodiment, a Q800 (TA Instruments, New Castle, DE) may be used.

In some embodiments, the seal 120, 220a, 220b, 320, 420a-420f, 520, 620, 720, 820, 920, 1020a-1020e is made of at least a first material that includes any of the following non-limiting list of materials: a rubber including an unsaturated rubber or a saturated rubber; a thermoplastic elastomer; a thermoset elastomer; a thermoplastic vulcanizate; or a mixture or combination thereof. Exemplary thermoplastic elastomers (TPEs) include a polyamide TPE, a copolyester TPE, an olefinic TPE, a styrenic TPE, a urethane TPE, or a dynamically vulcanized TPE, or a mixture or combination thereof.

In some embodiments, the material for forming the seal may be selected based on the desired Shore hardness of the resulting seal. In some embodiments, the seal has a Shore A value of at least 25, at least 30, at least 35, at least 40, at least 45, at least 50, at least 55, or at least 60. In some embodiments, the seal has a Shore A value of up to 40, up to 45, up to 50, up to 55, up to 60, up to 65, up to 70, up to 75, up to 80, up to 85, or up to 90. In an exemplary embodiment, the seal has a Shore A value in a range of 30 to 90. In another exemplary embodiment, the seal has a Shore A value in a range of 40 to 70. In yet another exemplary embodiment, the seal has a Shore A value in a range of 50 to 70. In some embodiments, the Shore A value is determined as described in ASTM D2240-15e1. The Shore A value of the seal is preferably determined in the fully formed filter element—that is, after the coupling of the seal to the seal carrier and after the thermal welding of the seal carrier to the filter medium pack.

In contrast to U.S. Patent Publication No. 2009/0320424 which teaches using a soft urethane foam for a seal that forms an interface between a filter element and a filter housing to prevent unfiltered fluids from passing between the filter element and the fluid housing, the seal disclosed herein is formed by a multi-material injection molding manufacturing process, as further described herein. In addition, U.S. Patent Publication No. 2009/0320424 teaches the Shore A value of the seal is less than 25. Furthermore, when the seal includes a thermoplastic polymer as described herein instead of a urethane seal as described in U.S. Patent Publication No. 2009/0320424, advantages may be obtained in both manufacturing and use. In contrast to a urethane seal, which must be cured, a seal formed from a thermoplastic polymer by a multi-material injection molding manufacturing process does not require curing, increasing the efficiency of the manufacturing process. Moreover, a seal formed by a multi-material injection molding manufacturing process may be stable at higher temperatures (for example, up to 140° C.) compared to a urethane seal (which is typically stable only to about 80° C.), potentially providing greater stability during some uses during which the filter element 100 is exposed to hot conditions. For example, some filter elements 100 installed in engine compartments may be exposed to temperatures greater than 80° C. (for example, up to 90° C.) during use.

Exemplary unsaturated rubbers include natural polyisoprene including, for example, cis-1,4-polyisoprene natural rubber (NR) and trans-1,4-polyisoprene gutta-percha; synthetic polyisoprene (also referred to as isoprene rubber (IR)); polybutadiene (also referred to as butadiene rubber (BR)); chloroprene rubber (CR) including, for example, polychloroprene, Neoprene, Baypren, etc.; butyl rubber (also known as isobutylene-isoprene (IIR)); halogenated butyl rubbers including chloro butyl rubber (CIIR) and bromo butyl rubber (BIIR); styrene-butadiene rubber (SBR); nitrile rubber (also known as NBR, Buna N, or acrylonitrile butadiene rubber); hydrogenated nitrile butadiene rubbers (HNBR) including, for example, Therban and Zetpol.

Exemplary saturated rubbers include ethylene propylene rubber (EPM), a copolymer of ethylene and propylene; ethylene propylene diene (EPDM) rubber, a terpolymer of ethylene, propylene and a diene-component; epichlorohydrin rubber (ECO); polyacrylic rubber (ACM, ABR); silicone rubber (SI, Q, VMQ); fluorosilicone rubber (FVMQ); the FKM and FEPM families of fluoroelastomers including, for example, VITON, TECNOFLON, FLUOREL, AFLAS, and DAI-EL; perfluoroelastomers (FFKM) including, for example, TECNOFLON PFR, KALREZ, CHEMRAZ, PERLAST; polyether block amides (PEBA); chlorosulfonated polyethylene (CSM) including, for example, HYPALON; and ethylene-vinyl acetate (EVA).

Exemplary polyamide TPEs include a polyamide TPE including a soft segment with both ether and ester linkages (TPA-EE), a polyamide TPE including a polyester soft segment (TPA-ES), or a polyamide TPE including a polyether soft segment (TPA-ET), or mixtures or combinations thereof. Exemplary commercially available polyamide TPEs include PEBAX® and VESTAMID® E.

Exemplary copolyester TPEs include a copolyester TPE including a soft segment with both ether and ester linkages (TPC-EE), a copolyester TPE including a polyester soft segment (TPC-ES), or a copolyester TPE including a polyether soft segment (TPC-ET), or mixtures or combinations thereof. Exemplary commercially available copolyester TPEs include ARNITEL®, HYTREL®, PIBIFLEX®, and RITEFLEX®.

Exemplary olefinic TPEs include a blend of a polyolefin and a conventional rubber, the rubber phase in the blend having little or no crosslinking (TPO). Exemplary commercially available olefinic TPEs include APIGO®, and ENFLEX-O®.

Exemplary styrenic TPEs include a block copolymer of styrene and butadiene (TPS-SBS), a polystyrene-poly(ethylene-butylene)-polystyrene (TPS-SEBS), a polystyrene-poly(ethylene-propylene)-polystyrene (TPS-SEPS), or a block copolymer of styrene and isoprene (TPS-SIS), or mixtures or combinations thereof. Exemplary commercially available styrenic TPEs include SOFPRENE®, ELASTRON®, KRATON™, LAPRENE®, and THERMOLAST®.

Exemplary urethane TPEs include an urethane TPE including an aromatic hard segment and a polyester soft segment (TPU-ARES), a urethane TPE including an aromatic hard segment and a polyether soft segment (TPU-ARET), a urethane TPE including an aromatic hard segment and a soft segment with ester and ether linkages (TPU-AREE), a urethane TPE including an aromatic hard segment and a polycarbonate soft segment (TPU-ARCE), a urethane TPE including an aromatic hard segment and a polycaprolactone soft segment (TPU-ARCL), a urethane TPE including an aliphatic hard segment and a polyester soft segment (TPU-ALES), or a urethane TPE including an aliphatic hard segment and a polyether soft segment (TPU-ALET), or mixtures or combinations thereof. Exemplary commercially available urethane TPEs include DESMOPAN®, ELASTOLLAN®, and SOFPUR®.

Exemplary dynamically vulcanized TPEs include a combination of ethylene propylene diene monomer (EPDM) rubber and polypropylene in which the EPDM phase is highly crosslinked and finely dispersed in a continuous polypropylene phase (TPV-EPDM+PP), a combination of acrylonitrile-butadiene rubber (NBR) and polypropylene in which the NBR phase is highly crosslinked and finely dispersed in a continuous polypropylene phase (TPV-(NBR+PP)), a combination of natural rubber (NR) and polypropylene in which the NR phase is highly crosslinked and finely dispersed in a continuous polypropylene phase, a combination of epoxidized natural rubber (ENR) and polypropylene in which the ENR phase is highly crosslinked and finely dispersed in a continuous polypropylene phase (TPV-(ENR+PP)), or a combination of butyl rubber (also known as isobutylene-isoprene (IIR)) and polypropylene in which the butyl rubber phase is highly crosslinked and finely dispersed in a continuous polypropylene phase (TPV-(IIR+PP)), or mixtures or combinations thereof. Exemplary commercially available dynamically vulcanized TPEs include DRYFLEX®, ELASTRON®, SANTOPRENE™, SARLINK®, FORPRENE®, and THERMOLAST®. In one exemplary embodiment, the seal may include SARLINK® TPV 4155603, a dynamically vulcanized TPE from Teknor Apex Company (Pawtucket, Rhode Island).

Other commercially available TPEs that may be suitable in some embodiments include BERGAFLEX™.

In some embodiments, the seal carrier 140, 240, 340, 440a-440f, 540, 640, 740, 840, 940, 1040a-1040e or a portion thereof is made of at least a second material. The second material may preferably be a thermoplastic. In some embodiments, the second material may include any of the following non-limiting list of materials: acrylonitrile butadiene styrene (ABS), polypropylene (PP), polyamide (PA), polyethylene terephthalate (PET), polylactic acid (PLA), polyethylene (PE), polycarbonate (PC), polystyrene (PS), or polyvinyl chloride (PVC), or mixtures and combinations thereof. In some embodiments, including, for example when the second material includes PP, the seal carrier may further include a glass fiber or a mineral or a combination thereof. Exemplary polyamides include polyamide 6 (PA6), polyamide 66 (PA66), etc. The second material may additionally or alternatively include any other material suitable for thermal welding and multi-material injection molding.

In some embodiments, the entire seal carrier 140, 240, 340, 440a-440f, 540, 640, 740, 840, 940, 1040a-1040e includes the second material; in other embodiments, only a portion of the seal carrier include the second material. For example, in some embodiments, the first axial side 442a-442f, 1042a-1042e of the seal carrier 140, 240, 340, 440a-440f, 540, 640, 740, 840, 940, 1040a-1040e may include the second material but other parts of the seal carrier 140, 240, 340, 440a-440f, 540, 640, 740, 840, 940, 1040a-1040e may include one or more other injection molding materials. In another example, in some embodiments, the portion of the first axial side 442a-442f, 1042a-1042e of the seal carrier 140, 240, 340, 440a-440f, 540, 640, 740, 840, 940, 1040a-1040e that is intended to be attached to the filter medium pack 10, 110 may include the second material but other parts of the seal carrier 140, 240, 340, 440a-440f, 540, 640, 740, 840, 940, 1040a-1040e may include one or more other injection molding materials.

In embodiments where the seal carrier includes a polypropylene, the seal carrier may include a polypropylene random copolymer including, for example, DuPure® QR 50 AV (DUCOR Petrochemicals, the Netherlands) or DuPure® QR 76 AV (DUCOR Petrochemicals, the Netherlands); a random polypropylene including heterophasic copolymers additives including, for example, CAPILENE® CL 50 E (Carmel Olefins, Ltd., Israel); or Polystone® P Homopolymer (Röchling Engineering Plastics, Germany).

In some embodiments, a material or combination of materials for forming the seal carrier may be selected based on the desired Shore hardness of the resulting seal carrier.

In some embodiments, the seal carrier has a Shore A value of at least 50, at least 60, at least 70, at least 80, or at least 90. In some embodiments, the seal carrier has a Shore A value of up to 80, up to 90, up to 95, or up to 100. In an exemplary embodiment, the seal carrier has a Shore A value in a range of 60 to 100. In another exemplary embodiment, the seal carrier has a Shore A value in a range of 70 to 100. In yet another exemplary embodiment, the seal carrier has a Shore A value in a range of 80 to 100. In some embodiments, the Shore A value is determined as described in ASTM D2240-15e1, entitled "Standard Test Method For Rubber Property—Durometer Hardness." The Shore A value of the seal carrier is preferably determined in the fully formed filter element—that is, after the coupling of the seal to the seal carrier and after the thermal welding of the seal carrier to the filter medium pack.

In some embodiments, the seal carrier has a Shore D value of at least 10, at least 15, at least 20, at least 25, or at least 30. In some embodiments, the seal carrier has a Shore D value of up to 80, up to 90, up to 95, or up to 100. In an exemplary embodiment, the seal carrier has a Shore D value in a range of 15 to 100. In another exemplary embodiment, the seal carrier has a Shore D value in a range of 30 to 100. In some embodiments, the Shore D value of the seal carrier is determined as described in ASTM D2240-15e1, entitled "Standard Test Method For Rubber Property—Durometer Hardness." The Shore D value of the seal carrier is preferably determined in the fully formed filter element—that is, after the coupling of the seal to the seal carrier and the thermal welding of the seal carrier to the filter medium pack.

In some embodiments, as noted above, the seal carrier may include one or more ribs 45. If included, the one or more ribs 45 may be formed of the same material or combination of materials as at least a portion of the seal carrier.

During manufacture of the filter element, the first axial side 442a-442f, 1042a-1042e of the seal carrier 140, 240, 340, 440a-440f, 540, 640, 740, 840, 940, 1040a-1040e is heated and cooled twice—first as part of a multi-material injection molding manufacturing process and then during a thermal welding manufacturing process. A person having skill in the art may select the material or combination of materials for the seal carrier 140, 240, 340, 440a-440f, 540, 640, 740, 840, 940, 1040a-1040e and, more precisely the material to be used for the first axial side 442a-442f, 1042a-1042e of the seal carrier 140, 240, 340, 440a-440f, 540, 640, 740, 840, 940, 1040a-1040e, because of its ability to withstand being heated and cooled without degradation.

In some embodiments, a closed end cap 70 or supporting frame 60, located at the second axial face 8 of the filter medium pack 10, 110 is made of at least a third material. The third material may preferably be a thermoplastic. As noted above, in some embodiments, the third material may preferably be the same as a second material and/or the material used for the seal carrier 140, 240, 340, 440a-440f, 540, 640, 740, 840, 940, 1040a-1040e or for a portion thereof that includes the second material. When the material for the closed end cap 70 or supporting frame 60 is the same as the material used for the seal carrier 140, 240, 340, 440a-440f, 540, 640, 740, 840, 940, 1040a-1040e or the portion thereof that attaches to the filter medium pack 10, 110, then similar thermal welding manufacturing processes may be used to attach both the seal carrier 140, 240, 340, 440a-440f, 540, 640, 740, 840, 940, 1040a-1040e or portion thereof and the closed end cap 70 or supporting frame 60.

In some embodiments, the third material may include any of the following non-limiting list of materials: acrylonitrile butadiene styrene (ABS), polypropylene (PP), polyamide (PA), polyethylene terephthalate (PET), polylactic acid (PLA), polyethylene (PE), polycarbonate (PC), polystyrene (PS), or polyvinyl chloride (PVC), or mixtures and combinations thereof. In some embodiments when the second material includes PP, the seal carrier may further include a glass fiber or a mineral or a combination thereof. Exemplary polyamides include polyamide 6 (PA6), polyamide 66 (PA66), etc. The second material may additionally or alternatively include any other material suitable for thermal welding and multi-material injection molding.

In one exemplary embodiment, the closed end cap 70 or supporting frame 60 may include polypropylene. Exemplary polypropylene containing polymers include, for example, DuPure® QR 50 AV (DUCOR Petrochemicals, the Netherlands) or DuPure® QR 76 AV (DUCOR Petrochemicals, the Netherlands), CAPILENE® CL 50 E (Carmel Olefins, Ltd., Israel), and Polystone® P Homopolymer (Röchling Engineering Plastics, Germany).

In some embodiments, the material for forming the closed end cap 70 or supporting frame 60 is selected based on the desired Shore hardness of the resulting closed end cap 70 or supporting frame 60.

In some embodiments, the closed end cap 70 or supporting frame 60 has a Shore A value of at least 50, at least 60, at least 70, at least 80, or at least 90. In some embodiments, the closed end cap 70 or supporting frame 60 has a Shore A value of up to 80, up to 90, up to 95, or up to 100. In an exemplary embodiment, the closed end cap 70 or supporting frame 60 has a Shore A value in a range of 60 to 100. In another exemplary embodiment, the closed end cap 70 or supporting frame 60 has a Shore A value in a range of 70 to 100. In yet another exemplary embodiment, the closed end cap 70 or supporting frame 60 has a Shore A value in a range of 80 to 100. In some embodiments, the Shore A value is determined as described in ASTM D2240-15e1, entitled "Standard Test Method For Rubber Property—Durometer Hardness." The Shore A value of the closed end cap 70 or supporting frame 60 is preferably determined in the fully formed filter element—that is, after the coupling of the closed end cap to the filter medium pack.

In some embodiments, the closed end cap 70 or supporting frame 60 has a Shore D value of at least 10, at least 15, at least 20, at least 25, or at least 30. In some embodiments, the closed end cap 70 or supporting frame 60 has a Shore D value of up to 80, up to 90, up to 95, or up to 100. In an exemplary embodiment, the closed end cap 70 or supporting frame 60 has a Shore D value in a range of 15 to 100. In another exemplary embodiment, the closed end cap 70 or supporting frame 60 has a Shore D value in a range of 30 to 100. In some embodiments, the Shore D value is determined as described in ASTM D2240-15e1, entitled "Standard Test Method For Rubber Property—Durometer Hardness." The Shore D value of the closed end cap 70 or supporting frame 60 is preferably determined in the fully formed filter element—that is, after the coupling of the closed end cap to the filter medium pack.

Methods of Manufacturing the Filter Element

The present disclosure also describes methods of manufacturing the filter elements 100 described here.

In one aspect, the methods include coupling of the seal 120, 220a, 220b, 320, 420a-420f, 520, 620, 720, 820, 920, 1020a-1020e to the seal carrier 140, 240, 340, 440a-440f, 540, 640, 740, 840, 940, 1040a-1040e. In another aspect, the method includes simultaneous formation of the seal 120, 220a, 220b, 320, 420a-420f, 520, 620, 720, 820, 920, 1020a-1020e and the seal carrier 140, 240, 340, 440a-440f, 540, 640, 740, 840, 940, 1040a-1040e to form a seal arrangement.

In yet another aspect, the methods include thermal welding of the seal arrangement (including the seal and the seal carrier) to the filter medium pack 10.

In a further aspect, the methods include thermal welding of a closed end cap 70 to the filter medium pack 10.

Formation and/or Coupling of the Seal and the Seal Carrier

In some embodiments, the seal 120, 220a, 220b, 320, 420a-420f, 520, 620, 720, 820, 920, 1020a-1020e may be coupled to the seal carrier 140, 240, 340, 440a-440f, 540, 640, 740, 840, 940, 1040a-1040e by manufacturing the seal arrangement with a multi-material injection molding manufacturing process.

In some embodiments, the seal 120, 220a, 220b, 320, 420a-420f, 520, 620, 720, 820, 920, 1020a-1020e and the seal carrier 140, 240, 340, 440a-440f, 540, 640, 740, 840, 940, 1040a-1040e may be formed simultaneously by a multi-material injection molding manufacturing process. In some embodiments, such formation may be before the coupling of the seal carrier 140, 240, 340, 440a-440f, 540, 640, 740, 840, 940, 1040a-1040e to the filter medium pack 10, 110.

In some embodiments, the seal 120, 220a, 220b, 320, 420a-420f, 520, 620, 720, 820, 920, 1020a-1020e and a portion of the seal carrier 140, 240, 340, 440a-440f, 540, 640, 740, 840, 940, 1040a-1040e may be formed simultaneously by multi-material injection molding manufacturing process. In some embodiments, such formation may be after the coupling of a different portion of the seal carrier 140, 240, 340, 440a-440f, 540, 640, 740, 840, 940, 1040a-1040e to the filter medium pack 10, 110.

Alternatively, in some embodiments, the seal 120, 220a, 220b, 320, 420a-420f, 520, 620, 720, 820, 920, 1020a-1020e and the seal carrier 140, 240, 340, 440a-440f, 540, 640, 740, 840, 940, 1040a-1040e may each be formed by an injection molding manufacturing process, but the seal 120, 220a, 220b, 320, 420a-420f, 520, 620, 720, 820, 920, 1020a-1020e may be formed after the coupling of the seal carrier 140, 240, 340, 440a-440f, 540, 640, 740, 840, 940, 1040a-1040e to the filter medium pack 10, 110 including, for example, by overmolding using an injection molding manufacturing process.

Multi-material injection molding is the process of molding two or more different materials into one single-structure part. Multi-material injection molding may include, for example, multi-component injection molding, also referred to a co-injection molding; multi-shot injection molding, and overmolding. In the multi-material injection molding process, at least a first material and second material are used, wherein the seal 120, 220a, 220b, 320, 420a-420f, 520, 620, 720, 820, 920, 1020a-1020e includes at least the first material and the seal carrier 140, 240, 340, 440a-440f, 540, 640, 740, 840, 940, 1040a-1040e includes least the second material. In some embodiments, the multi-material injection molding manufacturing process may include molding only two materials, but in other embodiments, more than two materials may also be used.

A variety of different permutations using a multi-material injection molding manufacturing process to form a molded single-structure seal arrangement may be envisaged. For example, when the multi-material injection molding manufacturing process includes two-materials, the two different materials may be injected into a single mold to form a molded single-structure seal arrangement. In this way, a molded single-structure seal arrangement is obtained having two different regions of materials. The two different materials may be injected simultaneously (typically referred to as multi-component injection molding or co-injection molding) or sequentially (typically referred to as multi-shot injection molding) into a single mold. In an exemplary embodiment, two different types of polymers may be used as the two components, wherein one polymer forms the seal 120, 220a, 220b, 320, 420a-420f, 520, 620, 720, 820, 920, 1020a-1020e and the other polymer forms the seal carrier 140, 240, 340, 440a-440f, 540, 640, 740, 840, 940, 1040a-1040e or a portion thereof. Additional examples of various materials and combinations of materials that may be used for the seal and the seal carrier are further discussed herein.

Additionally or alternatively, overmolding may be used to form a molded single-structure seal arrangement wherein one material is layered on top of another material. If overmolding is used to form the seal 120, 220a, 220b, 320, 420a-420f, 520, 620, 720, 820, 920, 1020a-1020e or a portion thereof or the seal carrier 140, 240, 340, 440a-440f, 540, 640, 740, 840, 940, 1040a-1040e or a portion thereof, the overmolding is performed using an injection molding manufacturing process. Although overmolding may also be performed with polyurethane or thixotropic seals, such embodiments are not overmolding performed using an injection molding manufacturing process In some embodiments, the seal arrangement may include a third element that includes a third material that is different from the first material and the second material. The third element may be included in the seal arrangement in addition to the seal and the seal carrier or the third element may, for example, form only a portion of the seal carrier (for example, a portion of the seal carrier that is not thermally welded to the filter medium pack 10, 110). In such embodiments, a three-component injection molding manufacturing process may be used to form the seal arrangement. Alternatively, a two-component injection molding manufacturing process may be used to form a portion of the seal arrangement and overmolding may be used for form the remainder of the seal arrangement.

Using multi-material injection molding allows for the formation and/or joining of the seal 120, 220a, 220b, 320, 420a-420f, 520, 620, 720, 820, 920, 1020a-1020e and the seal carrier 140, 240, 340, 440a-440f, 540, 640, 740, 840, 940, 1040a-1040e without the use of a curable adhesive. The use of a curable adhesive requires curing time, thereby increasing manufacturing time. Thus, using multi-material injection molding allows for faster production of the filter element 10. In addition, the use of multi-material injection molding instead of a curable adhesive such as polyurethane provides the seal with greater stability and more dimensional stability, providing less risk of a leak during use and providing increased potential configurations and geometries for the location and orientation of the seal.

A filter medium pack 10, 110 may suffer damage, resulting in a decrease in efficiency, if exposed to the high temperatures required for multi-material injection molding. Thus, in some embodiments, the seal may preferably be coupled to the seal carrier and/or the seal arrangement may be formed by multi-material injection molding prior to the thermal welding of the seal arrangement to the filter medium pack 10, 110.

Thermal Welding Manufacturing Process

The thermal welding manufacturing process couples the seal carrier 140, 240, 340, 440a-440f, 540, 640, 740, 840, 940, 1040a-1040e and the filter medium pack 10, 110 using thermal welding. In some embodiments, as noted above, the seal carrier 140, 240, 340, 440a-440f, 540, 640, 740, 840, 940, 1040a-1040e may preferably already be part of the seal arrangement at the time of a thermal welding manufacturing process. Thermal welding is also referred to as plastic welding, thermal fusion, contact bonding, or direct bonding. In some embodiments, when the method of making the filter element 100 includes two thermal welding manufacturing processes, the thermal welding manufacturing process may be a first thermal welding manufacturing process.

The thermal welding manufacturing process includes at least three steps as further described below.

A first step includes providing a filter medium pack 10, 110 having an outer circumferential face 6 extending in a longitudinal direction Z and a first axial face 7 transverse to the longitudinal direction Z. As discussed above, the filter medium pack 10, 110 may include a pleated filter medium or a fluted filter medium or any other filter medium suitable for filtering a fluid.

A second step includes providing a seal carrier. The seal carrier 140, 240, 340, 440a-440f, 540, 640, 740, 840, 940, 1040a-1040e may be provided in the context of a seal arrangement that includes a seal 120, 220a, 220b, 320, 420a-420f, 520, 620, 720, 820, 920, 1020a-1020e, wherein the seal 120, 220a, 220b, 320, 420a-420f, 520, 620, 720, 820, 920, 1020a-1020e is present on the seal carrier 140, 240, 340, 440a-440f, 540, 640, 740, 840, 940, 1040a-1040e. In some embodiments, as further described herein, the seal arrangement is a molded single-structure seal arrangement that was formed by a multi-material injection molding manufacturing process. The seal carrier 140, 240, 340, 440a-440f, 540, 640, 740, 840, 940, 1040a-1040e includes a first axial side 442a-442f, 1042a-1042e.

A third step includes performing a thermal welding manufacturing process to couple the first axial side 442a-442f, 1042a-1042e of the seal carrier 140, 240, 340, 440a-440f, 540, 640, 740, 840, 940, 1040a-1040e to at least a circumferential portion of the first axial face 7 of the filter medium pack 10, 110.

Any suitable thermal welding manufacturing process may be used. Exemplary thermal welding processes include contact heating; hot air welding; hot gas welding; induction heating (that is, heating with high frequency electromagnetic waves); laser welding; mirror welding; vibration welding; spin welding; infrared welding; and friction welding including, for example, ultrasonic welding. In some embodiments a combination of different thermal welding processes may be used. In an exemplary embodiments, described in the Examples, a hot plate is used to heat the seal carrier.

In some embodiments, the thermal welding manufacturing process makes use of a heat source or thermal welding process that only locally heats the seal carrier 140, 240, 340, 440a-440f, 540, 640, 740, 840, 940, 1040a-1040e. More specifically, the thermal welding manufacturing process may preferably only heat the first axial side 442a-442f, 1042a-1042e of the seal carrier 140, 240, 340, 440a-440f, 540, 640, 740, 840, 940, 1040a-1040e or a portion of the first axial side 442a-442f, 1042a-1042e such that other elements or other sides of the seal carrier 140, 240, 340, 440a-440f, 540, 640, 740, 840, 940, 1040a-1040e do not deform or start melting. It is particularly preferred that, if present, the seal 120, 220a, 220b, 320, 420a-420f, 520, 620, 720, 820, 920, 1020a-1020e does not deform during heating of the seal carrier 140, 240, 340, 440a-440f, 540, 640, 740, 840, 940, 1040a-1040e.

In some embodiments, the first axial side 442a-442f, 1042a-1042e may be heated until a given layer thickness of the first axial side, a portion of the first axial side, or a specific volume of the first axial side has become deformable. In some embodiments, a thickness of at least 0.5 mm of the first axial side, at least 1 mm of the first axial side, a thickness of at least 1.5 mm of the first axial side, or a thickness of at least 2 mm of the first axial side becomes deformable. In some embodiments, a thickness of up to 2 mm of the first axial side, a thickness of up to 3 mm of the first axial side, a thickness of up to 4 mm of the first axial side, or a thickness of at least 5 mm of the first axial side becomes deformable. In this way, when the at least circumferential portion of the first axial face 7 of the filter medium pack 10, 110 is pressed into the first axial side 442a-442f, 1042a-1042e, the at least circumferential portion of the first axial face 7 of the filter medium pack 10, 110 enters by at least 0.5 mm, at least 1 mm, at least 1.5 mm, or at least 2 mm into the first axial side 442a-442f, 1042a-1042e of the seal carrier 140, 240, 340, 440a-440f, 540, 640, 740, 840, 940, 1040a-1040e.

In some embodiments, performing a thermal welding manufacturing process may include sub-steps: first, heating the first axial side 442a-442f, 1042a-1042e of the seal carrier 140, 240, 340, 440a-440f, 540, 640, 740, 840, 940, 1040a-1040e until at least a portion of the first axial side 442a-442f, 1042a-1042e becomes deformable. Second, bringing the filter medium pack 10, 110 and the seal carrier 140, 240, 340, 440a-440f, 540, 640, 740, 840, 940, 1040a-1040e together such that the at least a circumferential portion of the first axial face 7 of the filter medium pack 10, 110 is being pressed into the first axial side 442a-442f, 1042a-1042e of the seal carrier 140, 240, 340, 440a-440f, 540, 640, 740, 840, 940, 1040a-1040e. And, third, allowing the first axial side 442a-442f, 1042a-1042e of the seal carrier 140, 240, 340, 440a-440f, 540, 640, 740, 840, 940, 1040a-1040e to cool down such that the first axial side 442a-442f, 1042a-1042e of the seal carrier 140, 240, 340, 440a-440f, 540, 640, 740, 840, 940, 1040a-1040e is securely joined with at least a circumferential portion of the first axial face 7 of the filter medium pack.

The processing temperature required for thermal welding depends on the specific material chosen for the seal carrier 140, 240, 340, 440a-440f, 540, 640, 740, 840, 940, 1040a-1040e or the portion of the seal carrier to be attached to the filter medium pack 10, 110. The "processing temperature" is the temperature at which the portion of the first axial side 442a-442f, 1042a-1042e of the seal carrier 140, 240, 340, 440a-440f, 540, 640, 740, 840, 940, 1040a-1040e intended to be attached to the filter medium pack 10, 110 becomes deformable. When the seal carrier is formed of the same material or combination of materials throughout its volume, the "processing temperature" is the temperature at which the first axial side 442a-442f, 1042a-1042e of the seal carrier 140, 240, 340, 440a-440f, 540, 640, 740, 840, 940, 1040a-1040e becomes deformable. The processing temperature is measured by measuring the temperature of the portion of the surface of the first axial side 442a-442f, 1042a-1042e of the seal carrier 140, 240, 340, 440a-440f, 540, 640, 740, 840, 940, 1040a-1040e that is being heated.

The processing temperature is preferably greater than the transition temperature of the material forming the seal carrier 140, 240, 340, 440a-440f, 540, 640, 740, 840, 940, 1040a-1040e or forming the portion of the seal carrier 140, 240, 340, 440a-440f, 540, 640, 740, 840, 940, 1040a-1040e intended to be attached to the filter medium pack 10, 110.

As further discussed herein, when the seal carrier 140, 240, 340, 440a-440f, 540, 640, 740, 840, 940, 1040a-1040e or a portion thereof includes a polymeric fraction as a single phase in the amorphous state (including, for example, a polystyrene (PS) or a polycarbonate (PC)), the "transition temperature" of the material is the midpoint temperature ($T_{mg}$) determined using Differential Scanning Calorimetry (DSC) according to ASTM D3418-99, entitled "Standard Test Method for Transition Temperatures of Polymers by Differential Scanning Calorimetry." The midpoint temperature ($T_{mg}$) is used as a representation of the glass transition temperature ($T_g$) because the $T_g$ is, in practice, a temperature range. Any suitable instrument may be used to conduct DSC; however, in an exemplary embodiment, a DSC3+ (Mettler-Toledo AG, Schwerzenbach, Switzerland) with a FRS 6+ sensor may be used.

When the seal carrier 140, 240, 340, 440a-440f, 540, 640, 740, 840, 940, 1040a-1040e or a portion thereof includes a semi-crystalline polymeric material or any other materials displaying more than a single polymer phase (including, for example, a polypropylene (PP) or a polyethylene (PE)), the "transition temperature" of the material is the final temperature at which the elastic modulus, measured in shear (G'), and the loss modulus, measured in shear (G"), intersect, when G' and G" are plotted against temperature from 0° C. to a temperature at which the polymer is in a melt state. The rise of tan δ may be used to characterize a system under transition towards the melt flow zone. G', G", and tan δ are defined per ASTM D4092-01, entitled "Standard Terminology for Plastics: Dynamic Mechanical Properties." Herein G' and G" are determined using temperature sweeping dynamic mechanical analysis (DMA) according to ASTM D4440-15, entitled "Standard Test Method for Plastics: Dynamic Mechanical Properties Melt Rheology" using a mechanical spectrophotometer to measure forced constant amplitude fixed frequency shear oscillation. Any suitable dynamic mechanical analyzer may be used; however, in an exemplary embodiment, a Q800 (TA Instruments, New Castle, DE) may be used.

The preferred processing temperature may be selected by a person having skill in the art with reference to the transition temperature of the seal, the transition temperature of the material that forms the seal carrier 140, 240, 340, 440a-440f, 540, 640, 740, 840, 940, 1040a-1040e or the portion of the seal carrier to be attached to the filter medium pack 10, 110, the thermal welding method being used, and the configuration of the seal arrangement. In some embodiments, the processing temperature may be at least 5° C., at least 10° C., at least 15° C., at least 20° C., at least 25° C., at least 30° C., at least 35° C., at least 40° C., at least 45° C., or at least 50° C. greater than the transition temperature of the second material. In some embodiments, the processing temperature may be up to 50° C., up to 75° C., up to 100° C., up to 125° C., up to 150° C., up to 175° C., or up to 200° C. greater than the transition temperature of the second material.

In some embodiments, the processing temperature may be at least 100° C., at least 125° C., at least 150° C., at least 175° C., or at least 200° C. In some embodiments, the processing temperature may be up to 200° C., up to 225° C., up to 250° C., up to 300° C., up to 325° C., or up to 350° C. In an exemplary embodiment, the processing temperature may by in a range of 100° C. to 300° C. In another exemplary embodiment, the processing temperature may be in a range of 150° C. to 300° C. In yet another exemplary embodiment, the processing temperature may be in a range of 200° C. to 300° C.

In some embodiments, the seal carrier 140, 240, 340, 440a-440f, 540, 640, 740, 840, 940, 1040a-1040e is securely joined with at least a circumferential portion of the first axial face 7 of the filter medium pack when the join prevents leakage during separation of filtered fluid from unfiltered fluid by the filter element 100.

In some embodiments, including when the filter medium pack 10, 110 is a pleated filter medium pack 10, the filter medium pack 10 may be securely joined when the filter medium is embedded by at least 0.5 mm, at least 1 mm, at least 1.5 mm, or at least 2 mm into the seal carrier 140, 240, 340, 440a-440f and/or when the material of the seal carrier 140, 240, 340, 440a-440f impregnates at least 0.5 mm, at least 1 mm, at least 1.5 mm, or at least 2 mm of the pleats of the filter medium pack 10. That is, the end portions of the pleats are closed off by incorporation of the material of the first axial side 442a-442f, 1042a-1042e of the seal carrier 140, 240, 340, 440a-440f, 540, 640, 740, 840, 940, 1040a-1040e impregnating into the filter medium.

In some embodiments, including when the filter medium pack 10, 110 is a coiled fluted filter medium pack 110, the filter medium pack 110 may be securely joined when at least one layer of flutes is fully embedded into the seal carrier 540, 640, 740, 840, 940, 1040a-1040e and/or the material of the seal carrier 540, 640, 740, 840, 940, 1040a-1040e impregnates at least one layer of flutes. Without wishing to be bound by theory, although embedding at least one layer of flutes into the seal carrier 540, 640, 740, 840, 940, 1040a-1040e is believed to be sufficient to prevent leakage during separation of filtered fluid from unfiltered fluid by the filter element 100, in some embodiments, it may be desired to embed additional layers of flutes into the seal carrier 540, 640, 740, 840, 940, 1040a-1040e, or to embed partial layers of flutes into the seal carrier 540, 640, 740, 840, 940, 1040a-1040e, or both, to increase the strength of the bond between the filter medium pack 110 and the seal carrier 540, 640, 740, 840, 940, 1040a-1040e. In an exemplary embodiment, shown in FIG. 6, the strength of the bond between the filter medium pack 110 and the seal carrier 640 may be increased by including a rib 45 that is pressed into the first axial face 7 of the filter medium pack 110. Additional embodiments may also be envisioned where a rib 45 does not extend across the width of the first axial face 7 of the filter medium pack 110. For example, multiple ribs 45 which do or do not extend the width of the first axial face 7 could be placed around the circumference of the first axial face 7. When the ribs 45 do not extend the width of the first axial face, the ribs could form a configuration similar to the tick marks on an analog clock.

When the filter element 100 includes one or more ribs 45, heating the first axial side 442a-442f, 1042a-1042e of the seal carrier 140, 240, 340, 440a-440f, 540, 640, 740, 840, 940, 1040a-1040, may further include heating the rib or ribs 45 until becomes deformable. Further, during the second step of bringing the circumferential edge of the first axial face 7 of the filter medium pack 10, 110 together with the first axial side 442a-442f, 1042a-1042e of the seal carrier 140, 240, 340, 440a-440f, 540, 640, 740, 840, 940, 1040a-1040, the rib 45 may simultaneously be pressed into the first axial face 7.

In some embodiments, a thermal welding manufacturing process may further include heating at least a portion of the filter medium pack 10, 110 before bringing the filter medium pack 10, 110 and the seal carrier 140, 240, 340, 440a-440f, 540, 640, 740, 840, 940, 1040a-1040e together. Without wishing to be bound by theory it is believe that heating at least a portion of the filter medium pack 10, 110 before bringing the filter medium pack 10, 110 and the seal carrier 140, 240, 340, 440a-440f, 540, 640, 740, 840, 940, 1040a-1040e together may improve the bonding because contact with the filter medium pack 10, 110 does not decrease the temperature—and, therefore, deformability—of the seal carrier 140, 240, 340, 440a-440f, 540, 640, 740, 840, 940, 1040a-1040e as dramatically or as quickly, resulting in a stronger join between the two materials. In an exemplary embodiments, the filter medium pack 10, 110 may be heated to the same temperature as the seal carrier 140, 240, 340, 440a-440f, 540, 640, 740, 840, 940, 1040a-1040e before bringing the filter medium pack 10, 110 and the seal carrier 140, 240, 340, 440a-440f, 540, 640, 740, 840, 940, 1040a-1040e together. Whether at least a portion of the filter medium pack 10, 110 should be heated and to what extent may be determined by a skilled artisan at least in part based on the composition of the filter medium pack 10, 110. For example, some media including, for example, filter media including synthetic components may deform if heated or if heated above a certain temperature prior to being brought into contact with the seal carrier 140, 240, 340, 440a-440f, 540, 640, 740, 840, 940, 1040a-1040e.

In practice, when bringing the filter medium pack 10, 110 and the seal carrier 140, 240, 340, 440a-440f, 540, 640, 740, 840, 940, 1040a-1040 together such that the at least circumferential portion of the first axial face 7 of the filter medium pack 10, 110 is being pressed into the first axial side 442a-442f, 1042a-1042e of the seal carrier 140, 240, 340, 440a-440f, 540, 640, 740, 840, 940, 1040a-1040, a relative movement between the filter medium pack 10, 110 and the seal carrier 140, 240, 340, 440a-440f, 540, 640, 740, 840, 940, 1040a-1040 is made. Various options exist for making this relative movement. For example, the filter medium pack 10, 110 may be kept in a stationary position while the seal carrier 140, 240, 340, 440a-440f, 540, 640, 740, 840, 940, 1040a-1040 is moved. The seal carrier 140, 240, 340, 440a-440f, 540, 640, 740, 840, 940, 1040a-1040 may preferably be moved in a direction parallel with the longitudinal axis Z of the filter medium pack 10, 110. In alternative embodiments, the seal carrier 140, 240, 340, 440a-440f, 540, 640, 740, 840, 940, 1040a-1040 may be kept in a stationary position and the filter medium pack 10, 110 may be being moved. Further, it may be envisioned that both the seal carrier 140, 240, 340, 440a-440f, 540, 640, 740, 840, 940, 1040a-1040 and the filter medium pack 10, 110 may be being moved. The component that is kept in a stationary position may be held in the stationary position by any suitable means including, for example, a vacuum, a clamp, etc.

Without wishing to be bound by theory, it is believed that using a thermal welding manufacturing process to couple the seal carrier 140, 240, 340, 440a-440f, 540, 640, 740, 840, 940, 1040a-1040e and the filter medium pack 10 provides several advantages over, for example, the use of a an adhesive material, such as a glue, hotmelt, Sikaflex® (Sika, AG), and/or polyurethane (PU). First, the use of a thermoplastic for the seal carrier 140, 240, 340, 440a-440f, 540, 640, 740, 840, 940, 1040a-1040e can provide greater temperature resistance than adhesive materials such as PU. Second, the use of a thermal welding manufacturing process may improve manufacturing speed because no curing time is required. Finally, the use of a thermoplastic for the seal carrier may increase the ability of the filter element to be recycled; for example, by reheating, the seal carrier 140, 240, 340, 440a-440f, 540, 640, 740, 840, 940, 1040a-1040e could be removed the filter medium pack 10, and the components separately recycled.

Second Thermal Welding Manufacturing Process

When the filter element 100 includes supporting frame 60, the coupling of the supporting frame 60 to the second axial face 8 may be obtained by a second thermal welding manufacturing process.

The second thermal welding manufacturing process is a process that is similar to the first thermal welding manufacturing process but substitutes the supporting frame 60 for the seal carrier 140, 240, 340, 440a-440f, 540, 640, 740, 840, 940, 1040a-1040e.

The second thermal welding manufacturing process includes heating the supporting frame 60 or a portion thereof until a temperature is reached from which the supporting frame 60 or portion thereof becomes deformable; bringing the filter medium pack 10, 110 and the supporting frame 60 together such that the second axial face 8 of the filter medium pack 10, 110 is being pressed into the supporting frame 60 or a portion thereof; and allowing the supporting frame 60 or portion thereof to cool such that supporting frame 60 becomes securely joined with the second axial face 8 of the filter medium pack 10, 110.

The present invention is illustrated by the following examples. It is to be understood that the particular examples, materials, amounts, and procedures are to be interpreted broadly in accordance with the scope and spirit of the invention as set forth herein.

Exemplary Composition Aspects

Aspect 1. A filter element comprising:
  a filter medium pack, wherein the filter medium pack comprises an outer circumferential face extending in a longitudinal direction and a first axial face transverse to said longitudinal direction; and
  a molded single-structure seal arrangement comprising a seal and a seal carrier, wherein the seal comprises a first material and the seal carrier comprises a second material, and wherein the second material is different from the first material;
  wherein the seal carrier comprises a first axial side, and wherein the first axial side of the seal carrier is thermally welded to at least a circumferential portion of the first axial face of the filter medium pack.

Aspect 2. The filter element of Aspect 1 wherein the filter element is configured for placing in a housing of a filter system Aspect 3. The filter element of Aspect 2 wherein the molded single-structure seal arrangement is configured to separate filtered from unfiltered fluid when the filter element is operationally placed in the housing.

Aspect 4. The filter element of any one of previous Aspects wherein the transition temperature of the first material is greater than the transition temperature of the second material.

Aspect 5. The filter element of any one of previous Aspects wherein
  the first material comprises a rubber, a thermoplastic elastomer, a thermoset elastomer, a thermoplastic vulcanizate, or a mixture or combination thereof; and/or
  the second material comprises a thermoplastic.

Aspect 6. The filter element of any one of previous Aspects wherein first material comprises a thermoplastic elastomer, and the thermoplastic elastomer comprises a polyamide thermoplastic elastomer, a copolyester thermoplastic elastomer, an olefinic thermoplastic elastomer, a styrenic thermoplastic elastomer, a urethane thermoplastic elastomer, or a dynamically vulcanized thermoplastic elastomer, or a or a mixture or combination thereof.

Aspect 7. The filter element of any one of the previous Aspects
  wherein the seal has a Shore A value of at least 25, at least 30, at least 35, at least 40, at least 45, at least 50, at least 55, or at least 60; and/or
  wherein the seal has a Shore A value of up to 40, up to 45, up to 50, up to 55, up to 60, up to 65, up to 70, up to 75, up to 80, up to 85, or up to 90.

Aspect 8. The filter element of one of the previous Aspects wherein the seal has a Shore A value in a range of 30 to 90, in a range of 40 to 70, or in a range of 50 to 70.

Aspect 9. The filter element of any one of the previous Aspects
  wherein the seal carrier has a Shore A value of at least 50, at least 60, at least 70, at least 80, or at least 90; and/or
  wherein the seal carrier has a Shore A value of up to 80, up to 90, up to 95, or up to 100.

Aspect 10. The filter element of any one of the previous Aspects wherein the seal carrier has a Shore A value in a range of 60 to 100, in a range of 70 to 100, or in a range of 80 to 100

Aspect 11. The filter element of any one of the previous Aspects wherein the second material comprises a thermoplastic and the thermoplastic comprises acrylonitrile butadiene styrene (ABS), polypropylene (PP), polyamide (PA), polyethylene terephthalate (PET), polylactic acid (PLA), polyethylene (PE), polycarbonate (PC), polystyrene (PS), or polyvinyl chloride (PVC), or mixtures and combinations thereof.

Aspect 12. The filter element of any one of the previous Aspects
  wherein the seal carrier has a Shore A value of at least 50, at least 60, at least 70, at least 80, or at least 90; and/or
  wherein the seal carrier has a Shore A value of up to 80, up to 90, up to 95, or up to 100.

Aspect 13. The filter element of any one of the previous Aspects wherein the seal carrier has a Shore A value in a range of 60 to 100, in a range of 70 to 100, or in a range of 80 to 100.

Aspect 14. The filter element of any one of the previous Aspects
  wherein the seal carrier has a Shore D value of at least 10, at least 15, at least 20, at least 25, or at least 30; and/or
  wherein the seal carrier has a Shore D value of up to 80, up to 90, up to 95, or up to 100.

Aspect 15. The filter element of any one of the previous Aspects wherein the seal carrier has a Shore D value in a range of 15 to 100 or in a range of 30 to 100.

Aspect 16. The filter element of any one of the Aspects 1 to 15
  wherein the seal carrier comprises a radial circumferential side extending in said longitudinal direction and enclosing at least partly the outer circumferential face of the filter medium pack, and
  wherein the seal surrounds the radial circumferential side to form an outwardly directed radial seal.

Aspect 17. The filter element of any one of Aspects 1 to 15
  wherein the seal carrier comprises a tubular shaped extension extending in said longitudinal direction for forming a fluid entrance channel or a fluid exit channel for the filter medium pack, and
  wherein the seal surrounds an outer circumferential surface of the tubular shaped extension for forming an outwardly directed radial seal, or wherein the seal is located around an inner circumferential surface of the tubular shaped extension for forming an inwardly directed radial seal.

Aspect 18. The filter element of any one of Aspects 1 to 15
wherein the seal carrier comprises a central opening configured for exiting filtered fluid or for receiving unfiltered fluid, and
wherein the seal is coupled to an inner circumferential surface of the central opening so as to form an inwardly directed radial seal.

Aspect 19. The filter element of any one of Aspects 1 to 15
wherein the seal carrier comprises a second axial side opposing the first axial side, and
wherein the seal is coupled to the second axial side for forming an axial seal.

Aspect 20. The filter element of any one of the previous Aspects wherein the filter medium pack comprises a fluted filter medium or a pleated filter medium.

Aspect 21. The filter element of any one of previous Aspects
wherein the filter medium pack comprises a second axial face opposite to the first axial face, and
wherein the filter element further comprises a closed end cap coupled to the second axial face of the filter medium pack.

Aspect 22. The filter element of Aspect 21 wherein the closed end cap is thermally welded to the second axial face of the filter medium pack.

Aspect 23. The filter element of any one of Aspects 16 to 22 wherein the filter medium pack comprises a pleated filter medium and wherein the pleated filter medium is embedded by at least 0.5 mm, at least 1 mm, at least 1.5 mm, or at least 2 mm into the seal carrier.

Aspect 24. The filter element of Aspect 20 wherein the filter medium pack comprises fluted filter media comprising coiled layers of fluted filter material.

Aspect 25. The filter element of Aspect 24 wherein each of the coiled layers of fluted filter material comprises inlet flutes and outlet flutes oriented essentially parallel with said longitudinal direction, and wherein flute entrances of the inlet flutes or flute exits of the outlet flutes of at least an outer layer of the coiled layers are blocked by the first axial side of the seal carrier.

Aspect 26. The filter element of Aspect 20, 24, or 25 wherein the filter medium pack comprises a fluted filter medium comprising coiled fluted media layers,
wherein the number of successive fluted media layers blocked by the first axial side of the seal carrier is less than ten layers, less than eight layers, or less than six layers; and/or
wherein the number of successive fluted media layers blocked by the first axial side of the seal carrier is at least one layer or at least two layers.

Aspect 27. The filter element of any one of Aspects 20 or 24 to 26, the filter element further comprising a supporting frame coupled to a second axial face of the filter medium pack, wherein the second axial face is opposite to the first axial face.

Aspect 28. The filter element of Aspect 27 wherein the filter medium pack comprises a fluted filter medium comprising coiled fluted media layers, and wherein the supporting frame is configured to prevent the coiled fluted media layers from moving in said longitudinal direction.

Aspect 29. The filter element of any one of Aspects 20 or 24 to 28 wherein the seal carrier comprises one or more ribs arranged in a plane essentially parallel with the first axial face and wherein the one or more ribs are coupled to the first axial face of the filter medium pack.

Aspect 30. The filter element of Aspect 29 wherein the filter medium pack comprises a fluted filter medium comprising coiled fluted media layers, wherein the one or more ribs are configured to prevent the coiled fluted media layers from moving in said longitudinal direction.

Aspect 31. The filter element of any one of the previous Aspects wherein the molded single-structure seal arrangement is formed by a multi-material injection molding manufacturing process.

Aspect 32. The filter element of any one of the previous Aspects wherein the molded single-structure seal arrangement comprises a feed point, an ejector point, or a seam.

Aspect 33. The filter element of any one of the previous Aspects wherein the outer circumferential face has a shape of a circle, an oval, an ellipse, a rounded square, an obround shape, or a rectangle.

Exemplary Product-By Process Aspects

Aspect 1. A filter element for placing in a housing of a filter system comprising:
a filter medium pack, wherein the filter medium pack comprises an outer circumferential face extending in a longitudinal direction and a first axial face transverse to said longitudinal direction; and
a molded single-structure seal arrangement for separating filtered from unfiltered fluid when the filter element is operationally placed in the housing, and wherein the molded single-structure seal arrangement comprises a seal and a seal carrier, wherein the seal comprises a first material and the seal carrier comprises a second material, and wherein the second material is different from the first material;
wherein the seal is coupled to the seal carrier, and wherein the coupling of the seal to the seal carrier is obtained by manufacturing the seal arrangement from the first material and the second material by a multi-component injection molding manufacturing process; and
wherein the seal carrier comprises a first axial side that is coupled to at least a circumferential portion of the first axial face of the filter medium pack by a thermal welding manufacturing process.

Aspect 2. The filter element of Aspect 1 wherein the transition temperature of the first material is greater than the transition temperature of the second material.

Aspect 3. The filter element of any one of previous Aspects wherein
the first material comprises a rubber, a thermoplastic elastomer, a thermoset elastomer, a thermoplastic vulcanizate, or a mixture or combination thereof; and/or
the second material comprises a thermoplastic.

Aspect 4. The filter element of any one of previous Aspects wherein the filter medium pack comprises a fluted filter medium or a pleated filter medium.

Aspect 5. The filter element of any one of Aspects 1 to 4
wherein the seal carrier comprises a radial circumferential side extending in said longitudinal direction and enclosing at least partly the outer circumferential face of the filter medium pack, and
wherein the seal surrounds the radial circumferential side to form an outwardly directed radial seal.

Aspect 6. The filter element of any one of Aspects 1 to 4
wherein the seal carrier comprises a tubular shaped extension extending in said longitudinal direction for forming a fluid entrance channel or a fluid exit channel for the filter medium pack, and wherein the seal surrounds an outer circumferential surface of the tubular shaped extension for forming an outwardly directed radial seal, or wherein the seal is located around an inner circumferential surface of the tubular shaped extension for forming an inwardly directed radial seal.

Aspect 7. The filter element of any one of Aspects 1 to 4 wherein the seal carrier comprises a central opening configured for exiting filtered fluid or for receiving unfiltered fluid, and wherein the seal is coupled to an inner circumferential surface of the central opening so as to form an inwardly directed radial seal.

Aspect 8. The filter element of any one of Aspects 1 to 4 wherein the seal carrier comprises a second axial side opposing the first axial side, and wherein the seal is coupled to the second axial side for forming an axial seal.

Aspect 9. The filter element of any one of previous Aspects wherein the filter medium pack comprises a second axial face opposite to the first axial face, and wherein the filter element further comprises a closed end cap coupled to the second axial face of the filter medium pack by a second thermal welding manufacturing process.

Aspect 10. The filter element of any one of Aspects 4 to 9 wherein the filter medium pack comprises a pleated filter medium and wherein the pleated filter medium is embedded by at least 0.5 mm, at least 1 mm, at least 1.5 mm, or at least 2 mm into the seal carrier.

Aspect 11. The filter element of any one of Aspects 1 to 6 wherein the filter medium pack comprises fluted filter media comprising coiled layers of fluted filter material, and wherein the circumferential portion of the first axial face of the filter medium pack that is coupled to the first axial side of the seal carrier corresponds to a circumferential edge of the first axial face of the filter medium pack.

Aspect 12. The filter element of Aspect 11 wherein each of the coiled layers of fluted filter material comprises inlet flutes and outlet flutes oriented essentially parallel with said longitudinal direction, and wherein flute entrances of the inlet flutes or flute exits of the outlet flutes of at least an outer layer of the coiled layers are blocked by the first axial side of the seal carrier.

Aspect 13. The filter element of Aspect 11 or 12 wherein for a given number of successive layers of the coiled layers of fluted filter material the first axial side of the seal carrier is blocking entrances of the inlet flutes or blocking exits of the outlet flutes; and wherein the number of successive fluted media layers blocked by the first axial side of the seal carrier is less than ten layers, less than eight layers, or less than six layers; and/or wherein the number of successive fluted media layers blocked by the first axial side of the seal carrier is at least one layer or at least two layers.

Aspect 14. The filter element of any one of Aspects 11 to 13, the filter element further comprising a supporting frame coupled to a second axial face of the filter medium pack, wherein the second axial face is opposite to the first axial face.

Aspect 15. The filter element of Aspect 14 wherein the supporting frame is configured to prevent the coiled layers from moving in said longitudinal direction.

Aspect 16. The filter element of Aspect 14 or 15 wherein the coupling of the supporting frame to the second axial face of the filter medium pack is obtained by a second thermal welding manufacturing process.

Aspect 17. The filter element of any one of Aspects 11 to 16 wherein the seal carrier comprises one or more ribs arranged in a plane essentially parallel with the first axial face and wherein the one or more ribs are coupled to the first axial face of the filter medium pack.

Aspect 18. The filter element of Aspect 17 wherein the one or more ribs are configured to prevent the coiled layers from moving in said longitudinal direction.

Aspect 19. The filter element of Aspect 17 or 18 wherein the coupling of the one or more ribs with the first axial face of the filter medium pack is obtained as part of the thermal welding manufacturing process.

Aspect 20. The filter element of any one of previous Aspects wherein the thermal welding manufacturing process comprises steps of:

heating the first axial side of the seal carrier until at least a portion of the first axial side becomes deformable;

bringing the filter medium pack and the seal carrier together such that the at least circumferential portion of the first axial face of the filter medium pack is being pressed into the first axial side of the seal carrier; and allowing the first axial side of the seal carrier to cool down such that the first axial side is securely joined with the at least circumferential portion of the first axial face of the filter medium pack.

Aspect 21. The filter element of any one of the previous Aspects wherein the seal has a Shore A value of at least 25, at least 30, at least 35, at least 40, at least 45, at least 50, at least 55, or at least 60; and/or wherein the seal has a Shore A value of up to 40, up to 45, up to 50, up to 55, up to 60, up to 65, up to 70, up to 75, up to 80, up to 85, or up to 90.

Aspect 22. The filter element of any one of the previous Aspects wherein the seal has a Shore A value in a range of 30 to 90, in a range of 40 to 70, or in a range of 50 to 70.

Aspect 23. The filter element of any one of the previous Aspects wherein the seal carrier has a Shore A value of at least 50, at least 60, at least 70, at least 80, or at least 90; and/or wherein the seal carrier has a Shore A value of up to 80, up to 90, up to 95, or up to 100.

Aspect 24. The filter element of any one of the previous Aspects wherein the seal carrier has a Shore A value in a range of 60 to 100, in a range of 70 to 100, or in a range of 80 to 100.

Aspect 25. The filter element of any one of the previous Aspects wherein the seal carrier has a Shore D value of at least 10, at least 15, at least 20, at least 25, or at least 30; and/or wherein the seal carrier has a Shore D value of up to 80, up to 90, up to 95, or up to 100.

Aspect 26. The filter element of any one of the previous Aspects wherein the seal carrier has a Shore D value in a range of 15 to 100 or in a range of 30 to 100.

Aspect 27. The filter element of any one of previous Aspects wherein first material comprises a thermoplastic elastomer, and the thermoplastic elastomer comprises a polyamide thermoplastic elastomer, a copolyester thermoplastic elastomer, an olefinic thermoplastic elastomer, a styrenic thermoplastic elastomer, a urethane thermoplastic elastomer, or a dynamically vulcanized thermoplastic elastomer, or a or a mixture or combination thereof.

Aspect 28. The filter element of any one of the previous Aspects wherein the second material comprises a thermoplastic and the thermoplastic comprises acrylonitrile butadiene styrene (ABS), polypropylene (PP), polyamide (PA), polyethylene terephthalate (PET), polylactic acid (PLA), polyethylene (PE), polycarbonate (PC), polystyrene (PS), or polyvinyl chloride (PVC), or mixtures and combinations thereof.

Aspect 29. The filter element of any one of the previous Aspects wherein the outer circumferential face has a shape of a circle, an oval, an ellipse, a rounded square, an obround shape, or a rectangle.

Exemplary Method of Making Aspects

Aspect 1. A method of manufacturing a filter element, the method comprising:
providing a filter medium pack having a circumferential face extending in a longitudinal direction, and a first axial face transverse to said longitudinal direction;
providing a seal carrier; and
applying a thermal welding manufacturing process to couple a first axial side of the seal carrier to at least a circumferential portion of a first axial face of the filter medium pack.

Aspect 2. The method of Aspect 1 wherein the thermal welding manufacturing process comprises
heating the first axial side of the seal carrier until at least a portion of the first axial side becomes deformable;
bringing the filter medium pack and the seal carrier together such that the at least circumferential portion of the first axial face of the filter medium pack is being pressed into the first axial side of the seal carrier; and
allowing the first axial side of the seal carrier to cool down such that the first axial side of the seal carrier is becoming securely joined with the at least circumferential portion of the first axial face of the filter medium pack.

Aspect 3. The method of any one of the preceding Aspects wherein a seal arrangement comprises a molded single-structure seal arrangement comprising a seal carrier.

Aspect 4. The method of any one of the preceding Aspects wherein a seal arrangement comprises a molded single-structure seal arrangement comprising a seal and a seal carrier.

Aspect 5. The method of Aspect 3 or 4 wherein the method further comprises coupling the seal to the seal carrier by a multi-component injection molding manufacturing process.

Aspect 6. The method of Aspect 5 wherein the seal is coupled to the seal carrier prior to the application of the thermal welding manufacturing process.

Aspect 7. The method of Aspect 5 wherein the seal is coupled to the seal carrier after the application of the thermal welding manufacturing process.

Aspect 8. The method of any one of Aspects 3 to 7 wherein the seal arrangement is suitable for separating filtered from unfiltered fluid when the filter element is operationally placed in the housing.

Aspect 9. The method of any one of the preceding Aspects wherein a processing temperature of the thermal welding process is greater than a transition temperature of a portion of the first axial side of the seal carrier being heated.

Aspect 10. The method of any one of Aspects 1 to 9 wherein the filter medium pack comprises a pleated filter medium pack, and wherein the method comprises embedding at least 0.5 mm, at least 1 mm, at least 1.5 mm, or at least 2 mm of the first axial face of the filter medium pack into the first axial side of the seal carrier.

Aspect 11. The method of any one of Aspects 1 to 9 wherein the filter medium pack comprises a fluted filter medium pack comprising coiled flutes; and
wherein the method comprises impregnating at least one layer of flutes with a material of the first axial side of the seal carrier; and/or
wherein the method comprises impregnating at least up to six layers, up to eight layers, or up to ten layers of flutes with a material of the first axial side of the seal carrier.

Aspect 12. The method of any one of the preceding Aspects wherein the method further comprises embedding a rib in the first axial side of the seal carrier.

Aspect 13. The method of any one of Aspects 2 to 12 wherein the method further comprises heating the first axial face of the filter medium pack prior to bringing the filter medium pack and the seal carrier together such that the at least circumferential portion of the first axial face of the filter medium pack is being pressed into the first axial side of the seal carrier.

Aspect 14. The method of any one of the preceding Aspects wherein the method further comprises a second thermal welding manufacturing process, the second thermal welding manufacturing process comprising coupling a supporting frame to a second axial face of the filter medium pack.

Aspect 15. A filter element obtained by the method of any one of the preceding Aspects.

EXAMPLES

All reagents, starting materials, and solvents used in the following examples were purchased from commercial suppliers (such as Sigma Aldrich, St. Louis, MO) and were used without further purification unless otherwise indicated.

Thermal Welding Method

An end cap (also referred to herein as a seal carrier), with or without a seal, is positioned in a fixture and held in place by vacuum. A filter medium pack is positioned in another fixture.

Heat source (a hot plate) is set to 350° C. and is positioned between the end cap and the filter medium pack (FIG. 13A).

End cap is pressed against the hot plate for 20 seconds (FIG. 13B). Optionally, depending on the distance between the filter medium pack and the hot plate, the hot plate also warms the filter medium pack.

End cap is lifted away from the hot plate, and the hot plate is removed.

End cap is moved toward the filter medium pack (indicated by the arrows in FIG. 13C) at a set speed (1 mm/s and 3 mm/s were tested) and for a set distance (for example, 1.5 mm). Once the set distance is achieved, the end plate is then held in place for 15 seconds (FIG. 13D).

The resulting joined parts are removed from the fixtures.

Example 1

This Example describes the fusion of a cellulose pleated media to a seal carrier.

Using the method described above and as shown in FIG. 13, a pleated media pack was fused to a seal carrier made from Polystone® P Homopolymer (Röchling Engineering Plastics, Germany). The filter medium pack was also heated by the hot plate to a temperature in a range of 100° C. to 200° C. (more preferably 100° C. to 150° C.). Exemplary results are shown in FIG. 14. The filter medium is embedded approximately 1 mm into the seal carrier.

Example 2

This Example describes the fusion of a synthetic fluted media to a seal carrier.

Using the method described above, a fluted media pack was fused to a seal carrier made from Polystone® P Homopolymer (Röchling Engineering Plastics, Germany). The filter medium pack was not heated or was very gently heated by the hot plate prior to fusion. Exemplary results are shown in FIG. 15. Approximately 2 layers of flutes are embedded into the seal carrier, at the location indicated by the arrow in FIG. 15A.

| REFERENCE NUMBERS | |
|---|---|
| 6 | outer circumferential face of the filter medium pack |
| 7 | first axial face of the filter medium pack |
| 8 | second axial face of the filter medium pack |
| 10 | pleated filter medium pack |
| 110 | fluted filter medium pack |
| 120, 220a, 220b, 320, 420a-420f, 520, 620, 720, 820, 920, and 1020a-1020e | seal |
| 140, 240, 340, 440a-440f, 540, 640, 740, 840, 940, 1040a-1040e | seal carrier |
| 41 | radial circumferential side of the seal carrier |
| 442a-442f, 1042a-1042e | first axial side of seal carrier |
| 43 | tubular shaped extension of the seal carrier |
| 44 | second axial side of the seal carrier, second circumferential border of the seal carrier |
| 45 | rib of the seal carrier |
| 60 | supporting frame |
| 61 | border of supporting frame |
| 62 | rib of supporting frame |
| 70 | closed end cap |
| 100 | filter element |

What is claimed is:

1. A filter element comprising:
    a filter medium pack, wherein the filter medium pack comprises an outer circumferential face extending in a longitudinal direction and a first axial face transverse to said longitudinal direction; and
    a molded single-structure seal arrangement comprising a seal and a seal carrier, wherein the seal comprises a first material and the seal carrier comprises a second material, wherein a transition temperature of the first material is greater than a transition temperature of the second material, and wherein the second material is different from the first material;
    wherein the seal carrier comprises a first axial side, and wherein the first axial side of the seal carrier is thermally welded to at least a circumferential portion of the first axial face of the filter medium pack.

2. The filter element of claim 1, configured for placing in a housing of a filter system,
    wherein the molded single-structure seal arrangement separates filtered from unfiltered fluid when the filter element is operationally placed in the housing;
    wherein the seal is coupled to the seal carrier, and wherein the coupling of the seal to the seal carrier is obtained by manufacturing the seal arrangement from the first material and the second material using a multi-component injection molding manufacturing process; and
    wherein the first axial side of the seal carrier is thermally welded to at least a circumferential portion of the first axial face of the filter medium pack by a thermal welding manufacturing process.

3. The filter element of claim 2, wherein the thermal welding manufacturing process comprises steps of
    heating the first axial side of the seal carrier until at least a portion of the first axial side becomes deformable;
    bringing the filter medium pack and the seal carrier together such that the at least circumferential portion of the first axial face of the filter medium pack is being pressed into the first axial side of the seal carrier; and
    allowing the first axial side of the seal carrier to cool down such that the first axial side is securely joined with the at least circumferential portion of the first axial face of the filter medium pack.

4. The filter element of claim 1, wherein:
    the first material comprises a rubber, a thermoplastic elastomer, a thermoset elastomer, a thermoplastic vulcanizate, or a mixture or combination thereof; and/or
    the second material comprises a thermoplastic.

5. The filter element of claim 1,
    wherein the first material comprises a thermoplastic elastomer, and the thermoplastic elastomer comprises a polyamide thermoplastic elastomer, a copolyester thermoplastic elastomer, an olefinic thermoplastic elastomer, a styrenic thermoplastic elastomer, a urethane thermoplastic elastomer, or a dynamically vulcanized thermoplastic elastomer, er a or a mixture or combination thereof.

6. The filter element of claim 1,
    wherein the seal carrier comprises a radial circumferential side extending in said longitudinal direction and enclosing at least partly the outer circumferential face of the filter medium pack, and
    wherein the seal surrounds the radial circumferential side to form an outwardly directed radial seal.

7. The filter element of claim 1,
    wherein the seal carrier comprises a tubular shaped extension extending in said longitudinal direction for forming a fluid entrance channel or a fluid exit channel for the filter medium pack, and
        wherein the seal surrounds an outer circumferential surface of the tubular shaped extension for forming an outwardly directed radial seal, or
        wherein the seal is located around an inner circumferential surface of the tubular shaped extension for forming an inwardly directed radial seal.

8. The filter element of claim 1,
    wherein the seal carrier comprises a central opening configured for exiting filtered fluid or for receiving unfiltered fluid, and
    wherein the seal is coupled to an inner circumferential surface of the central opening so as to form an inwardly directed radial seal.

9. The filter element of claim 1,
    wherein the seal carrier comprises a second axial side opposing the first axial side, and
    wherein the seal is coupled to the second axial side for forming an axial seal.

10. The filter element of claim 1,
    wherein the filter medium pack comprises a second axial face opposite to the first axial face, and
    wherein the filter element further comprises a closed end cap coupled to the second axial face of the filter medium pack.

11. The filter element of claim 10 wherein the closed end cap is thermally welded to the second axial face of the filter medium pack by a second thermal welding manufacturing process.

12. The filter element of claim 1, wherein the filter medium pack comprises fluted filter media comprising coiled layers of fluted filter material, wherein each of the coiled layers of fluted filter material comprises inlet flutes and outlet flutes oriented essentially parallel with said longitudinal direction, and wherein flute entrances of the inlet flutes or flute exits of the outlet flutes of at least an outer layer of the coiled layers are blocked by the first axial side of the seal carrier.

13. The filter element of claim 1, wherein the molded single-structure seal arrangement is formed by a multi-material injection molding manufacturing process.

14. A method of manufacturing a filter element, the method comprising:
providing a filter medium pack having a circumferential face extending in a longitudinal direction, and a first axial face transverse to said longitudinal direction;
providing a seal carrier, wherein a seal arrangement comprises a molded single-structure seal arrangement comprising a seal and the seal carrier, wherein the seal comprises a first material and the seal carrier comprises a second material, wherein a transition temperature of the first material is greater than a transition temperature of the second material; and
applying a thermal welding manufacturing process to couple a first axial side of the seal carrier to at least a circumferential portion of the first axial face of the filter medium pack.

15. The method of claim 14 wherein the thermal welding manufacturing process comprises
heating the first axial side of the seal carrier until at least a portion of the first axial side becomes deformable;
bringing the filter medium pack and the seal carrier together such that the at least circumferential portion of the first axial face of the filter medium pack is being pressed into the first axial side of the seal carrier; and
allowing the first axial side of the seal carrier to cool down such that the first axial side of the seal carrier is becoming securely joined with the at least circumferential portion of the first axial face of the filter medium pack.

16. The method of claim 14, wherein the method further comprises coupling the seal to the seal carrier by a multi-component injection molding manufacturing process.

17. The method of claim 14, wherein a processing temperature of the thermal welding process is greater than a transition temperature of a portion of the first axial side of the seal carrier being heated.

18. The method of claim 14, wherein the method further comprises heating the first axial face of the filter medium pack prior to bringing the filter medium pack and the seal carrier together such that the at least circumferential portion of the first axial face of the filter medium pack is being pressed into the first axial side of the seal carrier.

19. A filter element obtained by the method of claim 14.

* * * * *